United States Patent
Khobragade et al.

(10) Patent No.: US 12,373,118 B2
(45) Date of Patent: Jul. 29, 2025

(54) DYNAMIC AND ADAPTIVE MULTI-STREAMING IN DEDUPLICATION SYSTEMS

(71) Applicant: Dell Products L.P., Round Rock, TX (US)

(72) Inventors: Shashank Prakash Khobragade, Nagpur (IN); Santi Gopal Mondal, Bangalore (IN); Kalyan C Gunda, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 80 days.

(21) Appl. No.: 18/320,994

(22) Filed: May 21, 2023

(65) Prior Publication Data

US 2024/0385758 A1 Nov. 21, 2024

(51) Int. Cl.
*G06F 3/06* (2006.01)

(52) U.S. Cl.
CPC .......... *G06F 3/0629* (2013.01); *G06F 3/0608* (2013.01); *G06F 3/0641* (2013.01); *G06F 3/0653* (2013.01); *G06F 3/067* (2013.01)

(58) Field of Classification Search
CPC .... G06F 3/0629; G06F 3/0608; G06F 3/0641; G06F 3/0653; G06F 3/067
See application file for complete search history.

(56) References Cited

U.S. PATENT DOCUMENTS

| | | | |
|---|---|---|---|
| 7,975,061 B1 * | 7/2011 | Gokhale | G06F 3/0665 709/239 |
| 10,353,743 B1 * | 7/2019 | Frandzel | G06F 9/5038 |
| 11,016,664 B2 * | 5/2021 | Ben Dayan | H04L 67/06 |
| 2002/0099844 A1 * | 7/2002 | Baumann | H04L 47/125 709/232 |
| 2014/0304239 A1 * | 10/2014 | Lewis | G06F 3/0641 707/692 |

* cited by examiner

Primary Examiner — Kalpit Parikh
(74) Attorney, Agent, or Firm — Staniford Tomita LLP

(57) ABSTRACT

Resources of a deduplicated storage appliance are monitored to generate a consumption matrix indicating resource utilization. A threshold map associated with a subsystem is accessed. The subsystem is responsible for an operation involving files stored in the appliance. The threshold map specifies resources required by the subsystem for the operation and thresholds below which multi-streaming for the operation is allowed. An assessment is made as to whether the operation should be handled by multi-streaming. The assessment includes determining whether the resources are underutilized or overutilized based on the consumption matrix and the threshold map. When the resources are overutilized, multi-streaming is not triggered. When the resources are underutilized, multi-streaming is triggered. Periodic reassessments are made to determine whether the operation should be handled by multi-streaming.

20 Claims, 18 Drawing Sheets

DYNAMIC AND ADAPTIVE MULTI-STREAMING IN DEDUPLICATION SYSTEMS

TECHNICAL FIELD

The present invention relates generally to information processing systems, and more particularly to file operations in large-scale file systems.

BACKGROUND

Many enterprises rely on storage appliances to backup and protect their data. A storage appliance contains its own hardware, operating system, file system, and programs designed for reliable data storage and retrieval. The file system may include a deduplicated file system. File systems provide a way to organize data stored in storage and present that data to clients. A deduplicated file system is a type of file system that seeks to reduce the amount of redundant data that is stored. Generally, data that is determined to already exist on the storage system is not again stored. Instead, metadata including references is generated to point to the already stored data and allow for reconstruction. Using a deduplicated file system with a backup storage system can be especially attractive because backups often include large amounts of redundant data that do not have to be again stored thereby reducing storage costs. A large-scale deduplicated file system may hold many millions of files along with the metadata required to reconstruct the file.

In addition to backing up data from clients, a backup data storage appliance may support a variety of other operations on the files such as copying the files to a different location for purposes of replication, long term retention and storage, or other. Generally, it is desirable to complete such operations as quickly as possible. Conducting such operations in a deduplicated system can involve a greater amount of overhead as compared to traditional file systems due to the additional complexity of deduplication.

Parallelism is a technique that can enable faster completion of tasks by executing the tasks in parallel. Parallelism, however, can place high demands on resources. Resources of the storage appliance may be shared across many different components of the storage appliance such as a backup and deduplication engine. Using parallelism to conduct an operation while other operations are in progress can create a resource crunch. The consequences of a resource crunch can lead to slower overall performance of the storage appliance and even system crashes and failures.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
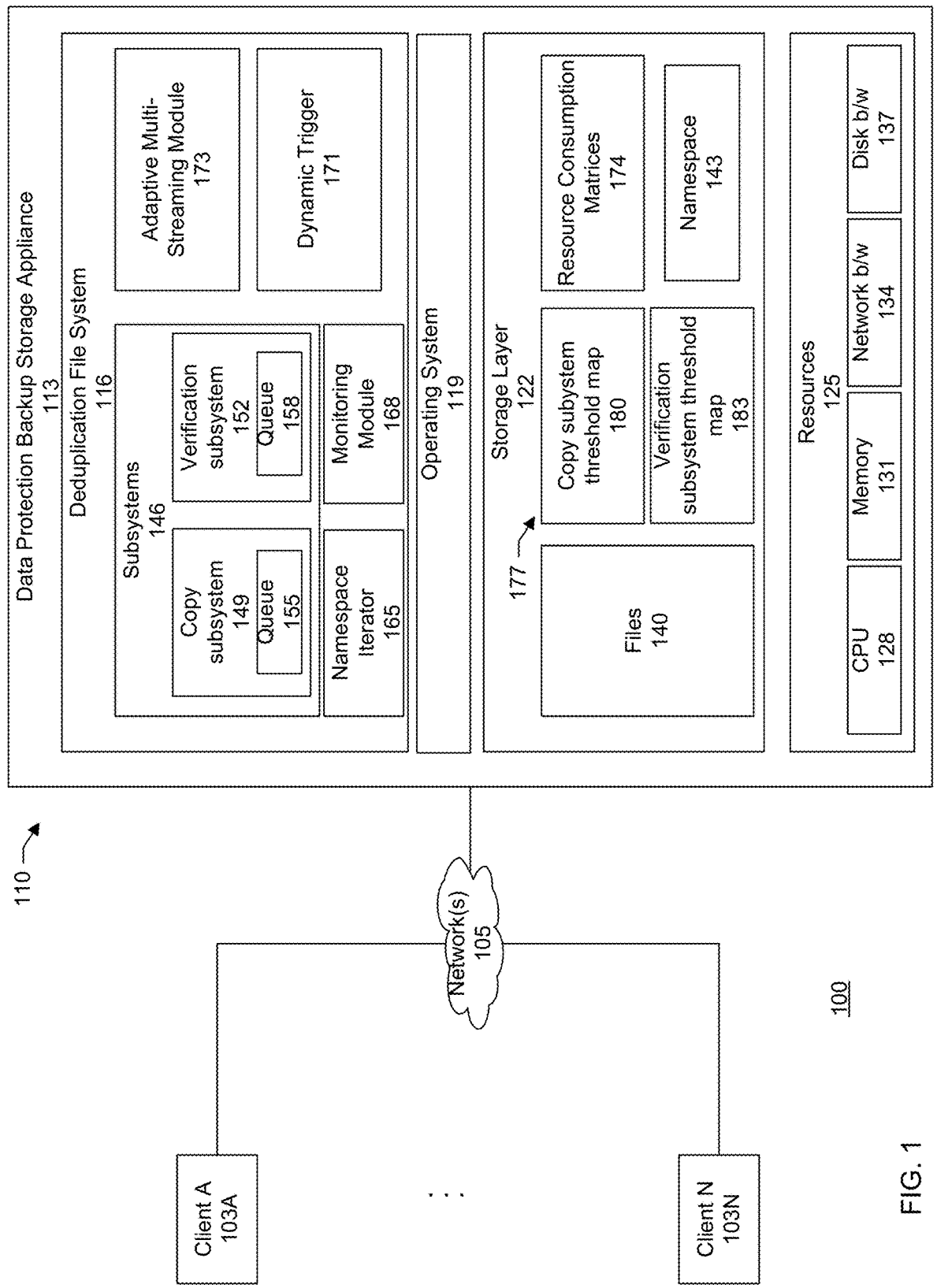
FIG. 1 shows a block diagram of an information processing system for dynamic and adaptive multi-streaming in a deduplicated storage system appliance, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks, components, and modules shown in the figures may be functional and there can be many different hardware configurations, software configurations, or both to implement the functions described.

FIG. 1 shows a simplified block diagram of an information processing system 100 within which methods and systems for dynamic and adaptive multi-streaming in deduplication (de-dup) systems may be implemented. As shown in the example of FIG. 1, a set of clients 103A-N are connected via a network 105 to a data protection or backup storage system 110. The data protection system includes any number of backup storage servers or appliances such as a storage appliance 113. In an embodiment, the storage appliance provides a secondary storage system for data (e.g., files) generated by the clients. Files stored on primary storage of the clients may be periodically backed up to the data protection system.

The clients may include servers, desktop computers, laptops, tablets, smartphones, internet of things (IoT) devices, or combinations of these. The data protection backup storage system receives requests from the clients, performs processing required to satisfy the requests, and forwards the results corresponding to the requests back to the requesting client system. The processing required to satisfy the request may be performed by the data protection storage appliance or may alternatively be delegated to other servers connected to the network.

The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The backup storage appliance may include a file system 116, operating system 119, storage layer 122, and resources 125. Resources may include any number of central processing units (CPUs) 128, memory 131, network bandwidth 134, disk bandwidth 137, or other resources. These resources may be used or consumed by the file system including components of the storage appliance and other programs when performing an operation, providing a service, or executing a workflow. For example, backing up files from the clients to the backup storage appliance requires CPU cycles, memory resources, network bandwidth, processing threads, disk utilization, and so forth as backup code and logic is executed, data is transferred over the network, and data is written to disk. The operating system is responsible for managing the resources and their access. The resources may be shared across the various processes, components, modules, services, subsystems, or code components of the storage appliance.

The file system provides a way to organize data stored at the storage layer and present that data to clients and applications in a logical format. The file system organizes the data into files and folders into which the files may be stored. When a client requests access to a file, the file system issues a file handle or other identifier for the file to the client. The client can use the file handle or other identifier in subsequent operations involving the file. A namespace 143 of the file system provides a hierarchical organizational structure for identifying file system objects through a file path. A file can be identified by its path through a structure of folders and subfolders in the file system. A file system may hold many hundreds of thousands or even many millions of files across many different folders and subfolders and spanning thousands of terabytes.

In an embodiment, the file system is a deduplicated file system. An example of a deduplicated file system includes a Data Domain File System (DDFS) as provided by Dell Technologies of Round Rock, Texas. Deduplication involves splitting a file to be written to the storage system into a set of segments and comparing fingerprints of the segments against fingerprints corresponding to segments that have previously already been stored and are present at the storage system. Segments of the file having matching fingerprints are considered redundant and do not have to be again stored. Segments of the file that do not have matching fingerprints are considered new and are stored. Metadata including references is generated to allow the file to be reassembled.

Storage of the backup data storage appliance include files 140, the namespace, and other metadata. Storage may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, shared storage pool, or an object or cloud storage service. In an embodiment, storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, storage may represent logical storage that includes any number of physical storage devices connected to form a logical storage.

The files correspond to data that has been backed up from the clients. These backup files or backup data may be stored in a format that is different from a native format of the primary file copies at the clients. For example, the backups may be stored in a compressed format, deduplicated format, or both. The namespace stores metadata associated with the files and tracks the various deduplicated segments of the files. In an embodiment, the file system metadata such as the names of files and their attributes is stored in a hierarchical tree data structure such as a B tree or B+ tree. The tree can have any number of levels. For example, there can be a root level, a leaf level, and one or more intermediate levels between the root and leaf levels. Pages in the intermediate levels store references to pages at the leaf level which then address or point to actual file data or content. Thus, in a large-scale deduplicated file system, a single intermediate page can reference many thousands of leaf pages.

Figure 2:
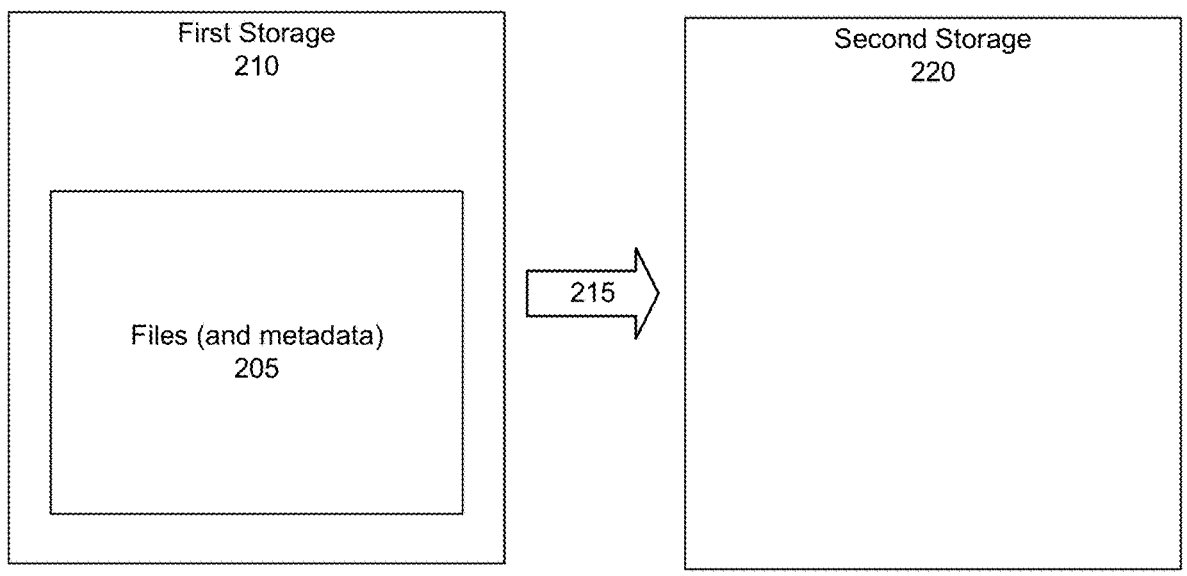
FIG. 2 shows a block diagram of an operation involving moving files from a storage location to a different storage location, according to one or more embodiments.

Files stored at the backup storage appliance may be moved, copied, or replicated to different storage. For example, FIG. 2 shows a block diagram of files (and associated metadata) 205 residing at a first storage 210 being moved 215 to a second storage 220. The first and second storages may represent different tiers of storage. Different storage tiers may have different types of storage devices. For example, recently backed up files may be placed in a first tier having high performance storage devices (e.g., solid state drives (SSDs)) as files recently backed up may be more likely to be accessed as compared to files from older backups. As backups age or frequency of access decreases, the files may be transferred from the first tier to a second tier having lower performance, but less expensive storage devices (e.g., hard disk drives (HDDs)).

In an embodiment, the first storage is referred to as an active tier and the second storage is referred to as a cloud tier. In this embodiment, the active tier includes the actual file copies. Initial backups from the clients are stored in the active tier. As these backups or secondary copies age, the backups may be moved to cloud storage as represented by the cloud tier. Cloud storage as offered by cloud storage providers can offer organizations economical storage of data. Some examples of cloud storage providers or public clouds include Amazon Web Services® (AWS Cloud) as provided by Amazon, Inc. of Seattle, Washington; Microsoft Azure® as provided by Microsoft Corporation of Redmond, Washington; Google Cloud® as provided Alphabet, Inc. of Mountain View, California; and others. The cloud storage provider makes resources available as services to its tenants over the network (e.g., internet). The cloud storage provider, however, is responsible for the underlying infrastructure. For example, Amazon Simple Storage Service (S3) provides storage for customer data in object storage. Data, such as files, may be stored as objects in logical containers referred to as buckets.

As another example, the first and second storages may represent different geographical sites. For example, the first storage may represent an on-site data center of an enterprise while the second storage may represent a remote off-site storage location. Files may be replicated from the first storage to the second storage for purposes of disaster recovery.

In an embodiment, operations including data movement operations such as moving certain files from the backup data storage appliance to a cloud are triggered based on evaluation of polices. The policies may be configured by a user of the data storage appliance. For example, a policy can specify one or more criteria or conditions for when files should be moved or migrated from the backup storage appliance to cloud storage. The conditions may include, for example, an age of a file or time that the file has remained in the active tier of the backup storage appliance, business unit of the organization that owns the file, date the file was last recalled from the backup storage appliance to a client, size of a file, directory that the file resides in, type of file (e.g., database), other conditions, or combinations of these. Alternatively, a data movement operation for one or more files may be triggered on-demand, such as via a request from the user. The policies are evaluated by the data storage appliance to identify files eligible for various operations (e.g., data movement operations).

Referring back now to FIG. 1, the file system may include any number of subsystems 146 to carry out various operations or workflows on files managed by the backup storage appliance. For example, there can be a copy subsystem 149, a verification subsystem 152, or other subsystem (e.g., recall subsystem). The subsystems include queues 155, 158, respectively. The queue provides for a temporary holding, staging, or buffering of files (or file regions) that are to be processed by one or more threads initiated by a respective subsystem. Each thread may be associated with a job.

In particular, the copy subsystem is responsible for workflows involving the copying of files including associated metadata to a different location. For example, files eligible for cloud storage may be moved from the storage appliance (e.g., source) to the cloud (e.g., destination). The verification subsystem is responsible for workflows involving verifying that the files, associated metadata, or both have been properly copied to the destination. Such verification may include, for example, reading the data copied to the destination, calculating checksums of the data, and comparing the checksums to checksums calculated before the copying. Verification is especially important in a deduplicated file system due to the importance that metadata plays in such a system. For example, a corruption in an intermediate level page of a tree structure storing the namespace of the file system can result in many thousands of files referenced by the intermediate page being unreachable. Verification can help ensure that file data is reachable through pointers, references, or other metadata. Thus, once a file or other unit of data has been copied to cloud storage by the copy subsystem, the unit of data is then input to the verify subsystem (e.g., placed onto the verify subsystem queue) to ensure that the unit of data was copied correctly.

Generally, it is desirable that these and other operations on the files be completed as quickly as possible. In an embodiment, multi-streaming is a technique that may be used to help speed such file operations and processing. Multi-streaming divides a file into two or more regions. Multiple threads can then be used to process the file where each thread processes a particular region in parallel or concurrently with another thread processing a different region. For example, a first thread may be responsible for reading a first unit of data at a first location and writing the first unit of data to a second location. A second thread, executing in parallel with the first thread, may be responsible for reading a second unit of data at the first location and writing the second unit of data to the second location. A thread refers to a separate flow of execution within a process. A process is an instance of a program that is being executed, while a thread is a single execution path within that process. Threads share the same memory space as the process that they belong to. This allows them to communicate and share data with each other.

Using multi-streaming to process an operation on a file can reduce the time required to complete the operation as compared to using a single-stream or thread because multi-streaming involves multiple threads processing different regions of the file at the same time. In other words, there are multiple small jobs being processed in parallel rather than a single thread processing a large job. Using multi-streaming to process an operation on a file, however, places a greater demand on resources as compared to using a single-stream. Since the resources of the backup storage appliance are shared across the various other processes of the file system, multi-streaming can cause resource bottlenecks and overwhelm a subsystem and other subsystems dependent on the subsystem.

A particular resource, such as CPU, network bandwidth, memory, or other resource may be unable to keep up with the demands from multi-streaming while also supporting other processes. Such a bottlenecking can cause delays, overall reduced throughput, or even a system crash. If a process requires a lot of CPU resources to execute but the CPU is already running at maximum capacity, the process may experience slow performance or even crash. More specifically, a particular operation on a set of files, such as moving the files from the backup storage appliance to cloud storage, may require a large amount of network bandwidth as multiple streams are transferring data to the cloud storage. This can introduce network and other delays that may affect other processes such as a client backup that may be in progress. The backup may exceed the backup window or other time allotted to conduct the backup and leave the client unprotected.

In an embodiment, secondary storage systems purposed as a backup data storage appliance, employs de-duplication to store more data in less space by leveraging data redundancy. Backup files are ingested into the secondary storage systems from a primary storage and are moved to different tiers or other de-dup systems for archiving and replication purposes. As per a restore requirement, the backup files are restored back to primary storage. In order to facilitate file movement across tiers, systems, and restore, high performance migration solutions are highly sought after, and hence performance enhancements like multi-streaming are very common in storage systems. Multi-streaming being a divide and conquer solution, slices files into multiple regions which are then processed in-parallel, speeding up the migration; but this performance improvement comes at a cost of increasing the load on system and migration subsystem resources. The bottleneck caused by multi-streaming negatively impacts migration performance, and hence the need of a resource load aware control mechanism arises which can ensure that multi-streaming is invoked only when benefits outweigh the cost.

In an embodiment, systems and techniques provide for a dynamic trigger which refers to or reviews system resources and migration subsystems consumption to invoke multi-streaming only when resources are underutilized. An embodiment continuously monitors the resource consumption to adapt multi-streaming as per resource availability, to further improve the migration performance.

Figure 3:
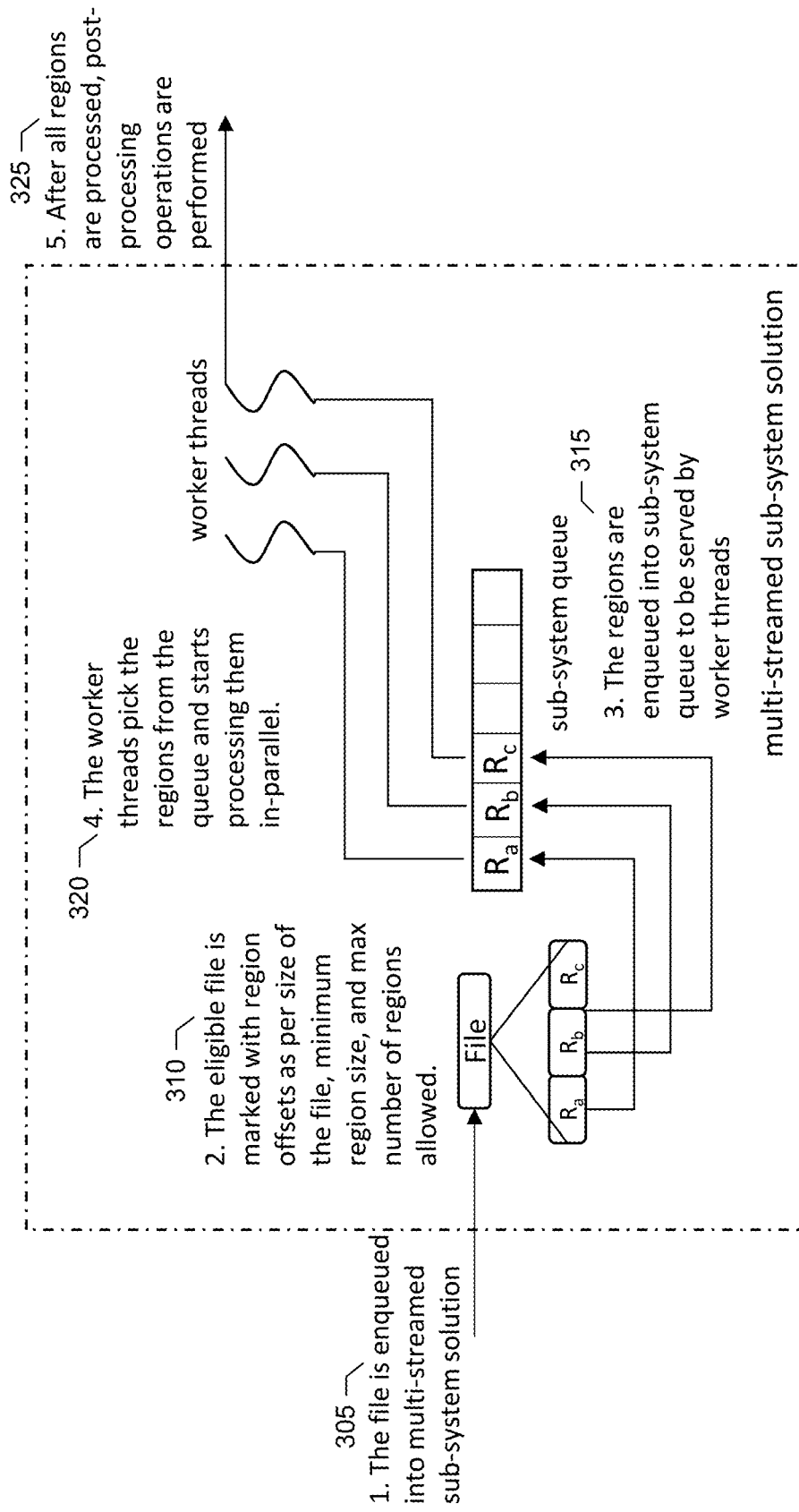
FIG. 3 shows an example of multi-streaming, according to one or more embodiments.

FIG. 3 shows a block diagram of a multi-streaming technique. Multi-streaming involves a divide and conquer algorithm, where the file is marked with multiple region offsets which are then processed in parallel to improve the performance with parallelization. Multi-streaming can be used in migration solutions like file-level replication where files are replicated to different storage systems and long-term retention solutions like cloud migration where files are migrated to cloud storage. It can also be used to speed-up file-level operations like metadata integrity verification or restore from a secondary storage.

As shown in the example of FIG. 3, in a first step 305, a file is enqueued into a multi-stream subsystem. In a second step 310, the eligible file is marked with region offsets according to a size of the file. There can be settings for a minimum region size, maximum number of regions allowed, or both. In a third step 315, the regions are enqueued into the subsystem queue to be served by threads (also referred to as worker threads) initiated by the subsystem. In a fourth step 320, the worker threads pick or retrieve regions from the queue and begin processing the regions in parallel. In a fifth step 325, after all regions are processed, post processing operations are performed.

As discussed, multi-streaming can be used to speed-up file operations. Multi-streaming marks the files satisfying eligibility criteria with multiple regions which are then processed in-parallel, but blind invocation of multi-streaming, solely based on eligibility criteria overwhelms the system resources as well as operation subsystems, which causes bottlenecks and negatively impacts performance, whereas, invocation during resource underutilization improves performance without any negative impact.

Figure 4:
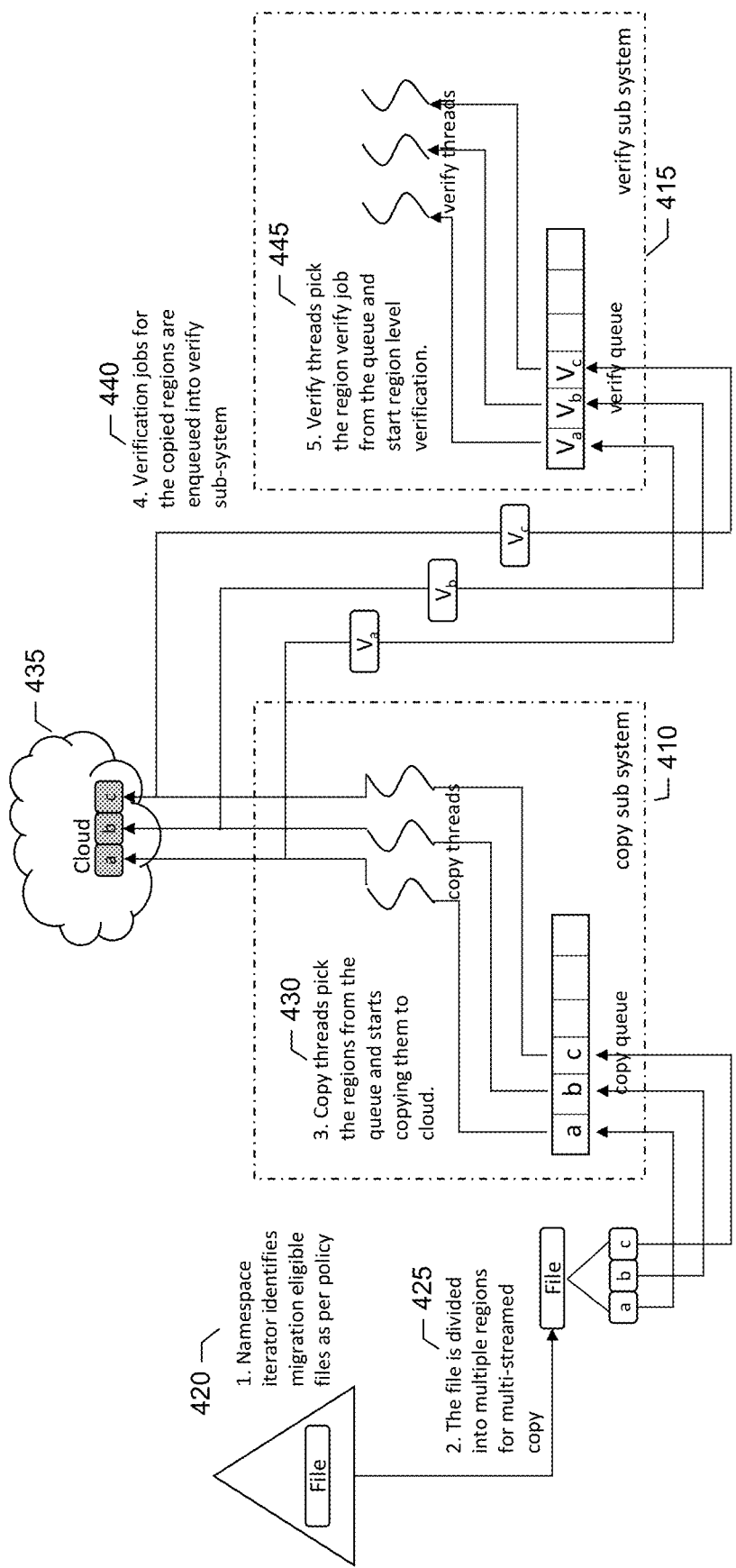
FIG. 4 shows an example of a multi-streamed cloud migration workflow, according to one or more embodiments.

For example, consider as shown in FIG. 4 a multi-streamed cloud migration workflow, where files satisfying eligibility criteria of being large in size and having bad locality are marked for region offsets, which are then enqueued into a copy subsystem 410 to be copied in-parallel to cloud 435. The copied regions are then enqueued into a verify subsystem 415 which are again processed in-parallel. More particularly, in a first step 420, a namespace iterator identifies migration eligible files as per policy. In a second step 425, the file is divided into multiple regions for a multi-streamed copy. The regions are placed onto a queue of the copy subsystem. In a third step 430, copy threads pick the regions from the queue and start copying them to a cloud storage 435. In fourth step 440, verification jobs for the copied regions are enqueued into the verify subsystem. In a fifth step 445, verify threads pick the region verify job from the queue of the verification subsystem and start region level verification.

System Resource Exhaustion

For de-dup systems, generation 0 data (e.g., new files) does not de-dup well on the cloud. This results in high network bandwidth utilization as most of the data migrated is unique. Whereas high generation data (e.g., updated files) de-dups well on cloud with previously migrated generations. This results in high disk bandwidth utilization as more metadata is read for segment filtration. Multi-streaming, without accounting for system resources, may become engaged and result in bottlenecks in network and disk respectively, negatively impacting the performance.

Migration Subsystem Exhaustion

For de-dup systems, higher generation data de-dups well on the cloud and gets copied faster as most of the data is filtered and not sent to the cloud; whereas, metadata verification, being directly proportional to the logical size, takes a longer time to complete. This results in a bottleneck in the migration subsystem where the verify subsystem is slower than the copy subsystem. Multi-streaming, without accounting subsystem load, continues to get engaged and further degrades the performance.

Multi-streaming is a double-edged sword. It can be used to improve performance but can lead to high system load, if not used optimally. In an embodiment, systems and techniques rectify this problem with a dynamically triggered and adaptive multi-streaming technique that ensures invocation only when system resources and subsystems are underutilized and adapts multi-streaming as per change in resource consumption and subsystem load.

Referring back now to FIG. 1, in an embodiment, the backup storage appliance further includes a namespace iterator 165, monitoring module 168, dynamic trigger 171, and adaptive multi-streaming module 173.

The namespace iterator is responsible for identifying files for which an operation is to be performed. In an embodiment, the identification of the files is the result of a policy evaluation. For example, the namespace iterator may iterate or traverse the namespace to identify files satisfying particular criteria such as a particular size, age, type, owner, or combinations of these as specified in a policy. The identified files may be marked as eligible for migration from the backup storage appliance to cloud storage (or other operation).

The monitoring module is responsible for collecting utilization information or metrics indicating demand on or usage of resources. Resource utilization may include a measurement of network usage, disk activity or utilization, memory utilization, CPU cycles, or other resource. For example, disk utilization may be expressed as disk busy percentage (%) which represents a percentage of elapsed time when the disk was busy processing a read or write request. The monitoring module may gather such metrics by, for example, communicating with the operating system. The monitoring module may gather performance logs that may be maintained by various resources of the storage appliance to track utilization.

Examples of resource utilization data, metrics, or counters include percentage disk read time (amount of time disks are being read), percentage disk time (amount of time disks are in use), percentage disk write time (amount of time disks are being written to), percentage idle time (amount of time disks are idle or not performing any action), current disk queue length (amount of time the operating system must wait to access the disks), disk reads/second (overall rate of read operations on the disk), disk writes/second (overall rate of write operations on the disk), split IO/second (overall rate at which the operating system divides I/O requests to the disk into multiple requests), and others.

CPU utilization refers to a computer's usage of processing resources, or the amount of work handled by a CPU. Actual CPU utilization varies depending on the amount and type of managed computing tasks. Certain tasks require heavy CPU time, while others require less because of non-CPU resource requirements.

Network bandwidth may be measured with respect to throughput, latency, jitter, packet loss, other metric, or combinations of these. Throughput measures the amount of data that can be transmitted over a network in a given period of time. Throughput may be expressed in bits per second (bps), kilobits per second (Kbps), or megabits per second (Mbps). Latency measures the time required for a packet of data to travel from one point on a network to another. Latency may be expressed in milliseconds (ms). Jitter measures the variation in the delay of packets as they travel across a network. Jitter may be expressed in milliseconds (ms). Packet loss measures the percentage of packets that are lost or do not arrive at their destination. Packet loss may be expressed as a percentage.

Memory may be measured with respect to usage, utilization, page file usage, other metric, or combinations of these. Memory usage or utilization measures the amount of memory that is being used by applications and system processes. Memory usage may be expressed in bytes, kilobytes (KB), megabytes (MB), or gigabytes (GB). Memory utilization can indicate the percentage of available memory that is currently being used. Memory utilization may be calculated by dividing the amount of memory that is currently being used by the total amount of available memory and multiplying by 100 percent. Page file usage measures the amount of virtual memory that is being used by applications and system processes. Page file usage may be expressed in bytes, KB, MB, or GB.

The resource consumption metrics collected by the monitoring module are stored in one or more resource consumption matrices 174.

Threshold maps 177 are associated with the subsystems. Each subsystem may be associated with a respective threshold map. For example, the copy subsystem may be associated with a copy subsystem threshold map 180. The verification subsystem may be associated with a verification subsystem threshold map 183, which may be different from the copy subsystem threshold map. A threshold map for a subsystem specifies resources required by the subsystem for processing an operation (e.g., copy) on a file and thresholds of each specified resource below which multi-threading is allowed (or, conversely, above which multi-threading is not allowed). The resources listed in a threshold map can be a subset of the overall resources of the storage appliance and are specific to a particular subsystem. Having specific threshold maps for specific subsystems recognizes the different resource demands required by different operations. For example, copying data may consume a different set or level of resources, or both as compared to verifying data.

There can be first and second threshold maps. The first threshold map may be associated with a first subsystem that is responsible for a first operation on a set of files. The first threshold map may specify a first set of resources demanded by the first subsystem when performing the first operation and first thresholds for the resources below which multi-streaming is allowed. The second threshold map may be associated with a second subsystem that is responsible for a second operation on the set of files. The second threshold map may specify a second set of resources demanded by the second subsystem when performing the second operation and second thresholds for the resources below which multi-streaming is allowed. The first and second set of resources may be different from each other. The first and second thresholds may be different from each other. For example, network bandwidth may be listed as a resource in both the first and second threshold maps, but the threshold values for network bandwidth may be different as the first and second operations may demand different levels of network bandwidth.

The dynamic trigger is responsible for comparing current resource utilization as captured in the resource consumption matrix and a threshold map associated with a subsystem to determine whether resources required by the subsystem for an operation are currently underutilized or overutilized. When the resources are underutilized, the dynamic trigger invokes multi-streaming. That is, the operation may be conducted using multiple streams processing file regions in parallel. When the resources are overutilized, the dynamic trigger does not invoke multi-streaming. That is, the operation may be conducted using a single stream.

The adaptive multi-streaming module is responsible for managing multi-streaming while an operation on a set of files is in progress. The adaptive multi-streaming module consults with the monitoring module throughout the operation to assess current resource utilization and make changes to multi-streaming accordingly.

In particular, the monitoring module tracks resource utilization throughout the operation as demands on the resources, availability of the resources, or both may change throughout the operation. For example, resources that were previously found to be overutilized may later be underutilized. Resources that were previously found to be underutilized may later be overutilized. The adaptive multi-streaming module periodically reassesses, throughout the operation, the resources required by the subsystem as specified in the threshold map against the updated resource consumption matrix in order to adapt to changes in resource demands or utilization.

An operation a set of files may initially be conducted using multi-streaming based on an initial assessment of the resources as being underutilized. Consider, as an example, that an assessment of resources at a start of an operation indicated three parallel streams as being available and thus a file is divided into three corresponding regions to be processed by the three streams in parallel. A change in resource availability during the operation may indicate that the resources are presently overutilized. For example, a backup job that was not yet started at a beginning of the operation may have been initiated after the operation started. As a result, the adaptive multi-streaming module may instruct the dynamic trigger to switch from a multi-stream to a single stream (or may reduce a number of multi-streams) for remaining files or file regions in the set of files yet to be processed. Thus, rather than three streams processing in parallel there may be only two streams processing in parallel or just a single stream.

Alternatively, an operation a set of files may initially be conducted using single-streaming based on an initial assessment of the resources as being overutilized. A change in resource availability during the operation may indicate that the resources are presently underutilized. For example, a backup job that was in progress at a start of the operation may have concluded after the operation was initiated. As a result, the adaptive multi-streaming module may instruct the dynamic trigger to switch from a single stream to multiple streams (or may increase a number of multi-streams) for remaining files or file regions in the set of files yet to be processed.

In other words, the monitoring module keeps track of system resources and subsystem resources consumption. The subsystem multi-streaming logic refers to this monitoring module to dynamically invoke multi-streaming for a file only when resources are underutilized. The adaptive logic, on the other hand, continues to periodically refer the monitoring module for each region of a multi-streaming invoked file, and further invokes intra-region multi-streaming to adapt as per newly available resources with a degree of multi-streaming adjusted as per resource availability.

For example, consider a multi-streamed copy subsystem for cloud migration, which in absence of any dynamic and adaptive logic suffers from system resources and migration subsystem exhaustion because of blind multi-streaming. An embodiment of a technique for dynamic and adaptive multi-streaming refers to or examines system resource utilization heuristics or metrics of network bandwidth, disk bandwidth, CPU, memory, as well as copy subsystem specific resource consumption heuristics or metrics like copy threads, copy queue, and copy streams. As per predetermined thresholds for resource consumption, multi-streaming is dynamically triggered to ensure that benefits outweigh the cost. Additionally, the adaptive logic engages intra-region multi-streaming as per availability of new resources with the degree of multi-streaming based on degree of resources availability.

Figure 5:
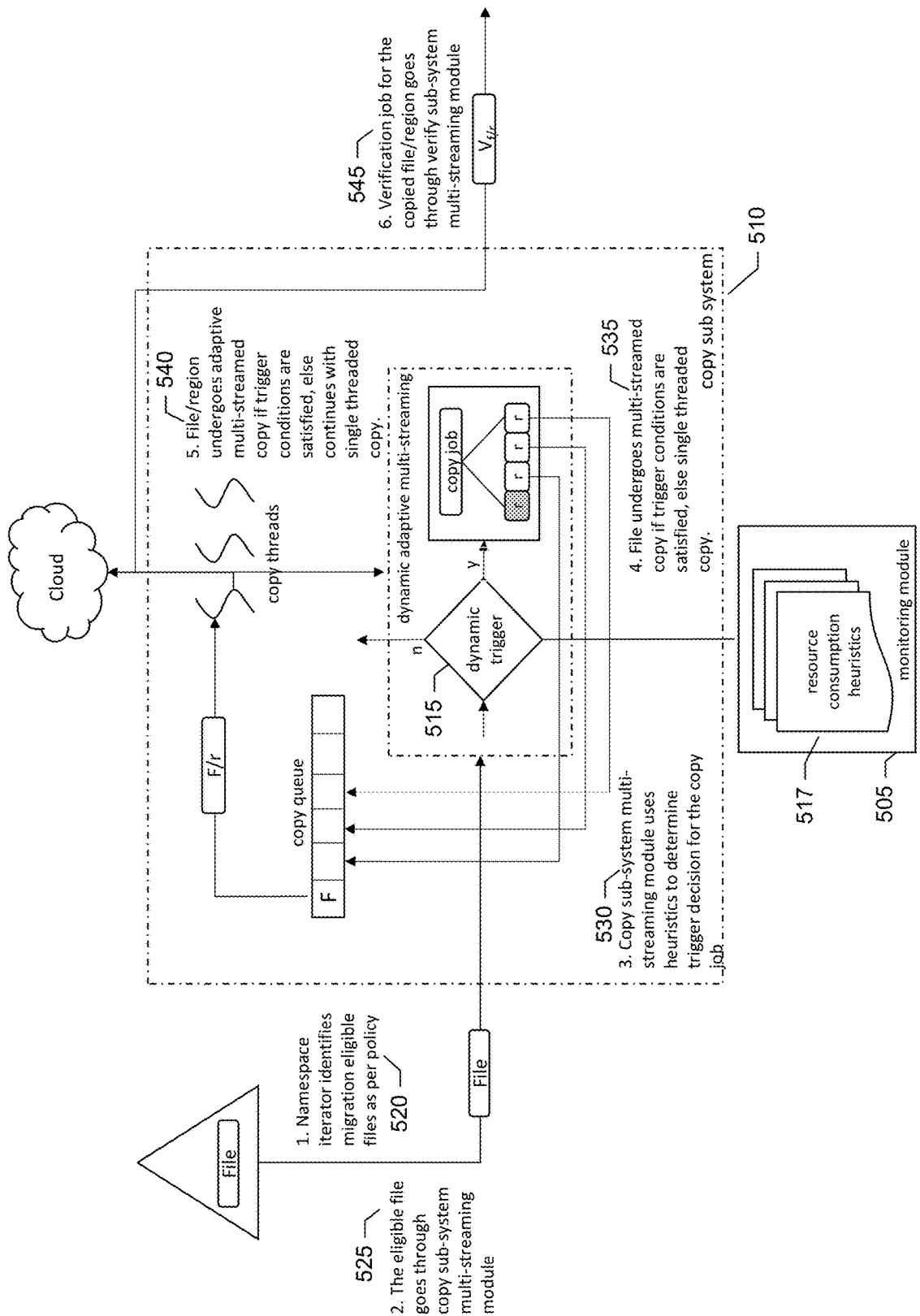
FIG. 5 shows an example of dynamic and adaptive multi-streaming for a cloud migration operation, according to one or more embodiments.

More particularly, FIG. 5 shows a block diagram for dynamic and adaptive multi-streaming for cloud migration. There is a monitoring module 505 outside a copy subsystem 510, and a dynamic trigger 515 that provides dynamic adaptive multi-streaming. The monitoring module periodically generates resource consumption heuristics or metrics 517 which measure current utilization of resources.

In a first step 520, a namespace iterator identifies migration eligible files as per policy. In a second step 525, the eligible file proceeds through a copy subsystem multi-streaming module. In a third step 530, the copy subsystem multi-streaming module uses heuristics or utilization metrics to determine a trigger decision for the copy job. In a fourth step 535, the file undergoes a multi-streamed copy if trigger conditions are satisfied. That is, the file is divided into a set of regions which are then placed onto a copy queue. A thread processes a region for copy to cloud storage in parallel with another thread processing another region for copy to the cloud storage. If the trigger conditions are not satisfied, the copy operation is performed using a single threaded copy. That is, rather than having multiple threads process multi-regions in parallel, the entire file is processed as a single region using a single thread to copy the file to the cloud storage. Using a single thread places a lower demand on resource consumption as compared to using multiple threads working in parallel.

In a fifth step 540, the file (or region) undergoes adaptive multi-streamed copy if trigger conditions are satisfied. If the trigger conditions are not satisfied, the file continues with a single threaded copy. In other words, the monitoring module collects and measures resource consumption throughout the copy operation to determine whether resources are currently under or overutilized. When resources are overutilized, the dynamic trigger may switch from multi-thread processing to single thread processing. When resources are underutilized, the dynamic trigger may switch from single thread processing to multi-thread processing.

In a sixth step 545, a verification job for the copied file or region goes through a verify subsystem multi-streaming module to verify that data was correctly transferred from the backup data storage appliance to the cloud storage.

Figure 6:
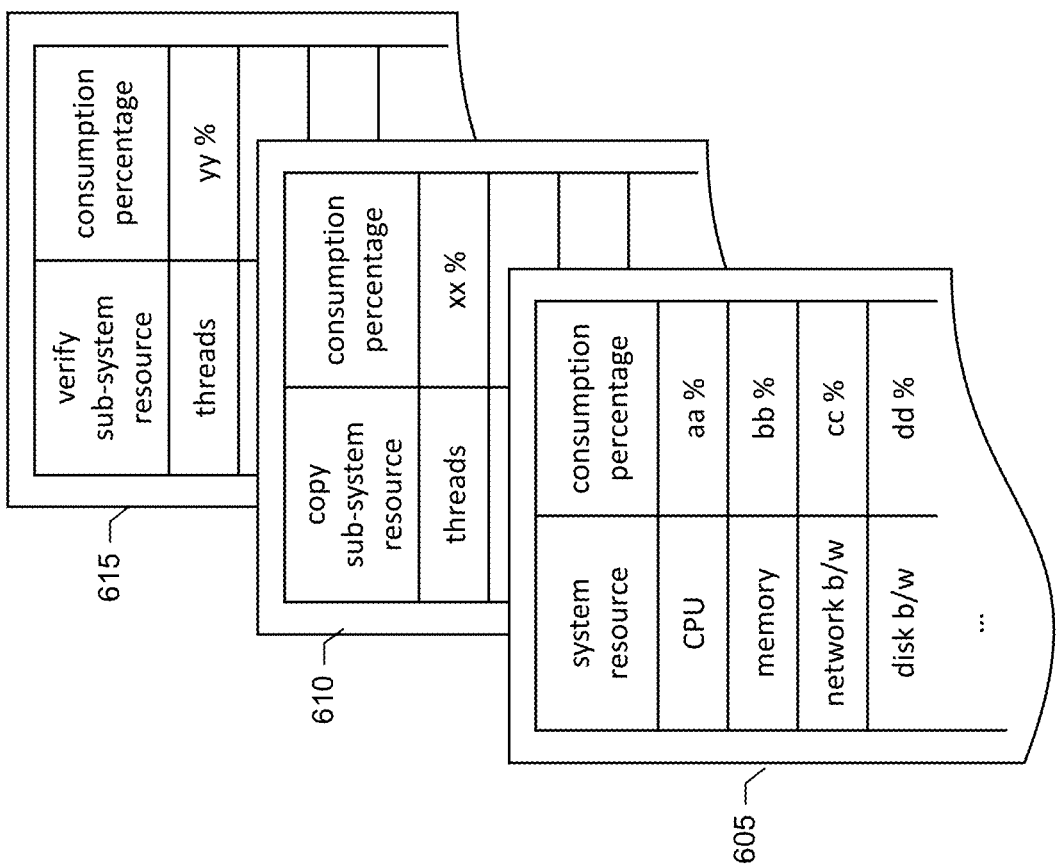
FIG. 6 shows examples of monitoring module resource consumption matrices, according to one or more embodiments.

FIG. 6 show examples of monitoring module matrices 605, 610, and 615. The monitoring module keeps track of consumption of resources of interest, to be referred by subsystems for dynamic trigger and adaptability. Resources consumption corresponds to system resources like CPU, memory, network bandwidth, disk bandwidth, read write streams, as well as migration subsystem resources like thread utilization and free subsystem queue slots. Thus, there can be a consumption matrix associated with system resources (e.g., memory, CPU, network bandwidth, and so forth), along with a consumption matrix specific to a particular subsystem or workflow that tracks utilization of resources associated with the particular subsystem. The consumption matrix or matrices are periodically updated. In order to handle frequent variations in heuristics or measurements, the monitoring module can keep track of fluctuations in last x minutes, ensuring the stable heuristics or measurements of resource availability and avoiding spurious values.

Table A below shows an example of pseudo code for the monitoring module.

TABLE A

```
procedure: update(matrix, count)
2d array matrix, integer count
integer usage;
begin
    for i := 0 step + 1 until count − 1 do
    begin
        comment get_stats queries system to
            get resource usage stats
        get_stat(matrix[i][0], usage);
        matrix[i][1] := usage;
    end
end
```

Table B below shows another example of pseudo code for the monitoring module.

TABLE B

```
procedure: get(resource, usage)
2d array matrix integer id, usage;
Begin
    comment resource_to_id maps the
        resource with corresponding
        heuristics matrix and id
    resource_to_id(resource, matrix, id);
    usage := matrix[id][1];
end
```

Table C below shows another example of pseudo code for the monitoring module.

TABLE C

```
thread: monitoring_module(resource_matrices, count, row_counts,
duration)
array resource_matrices, row_counts integer count, duration
global bool abort
```

TABLE C-continued

```
begin
loop:
    for i := 0 step + 1 until count − 1 do
    begin
        update(resource_matrices[i], row_counts[i])
    end
    sleep duration
    if not abort then begin goto loop end
end
```

Figure 7:
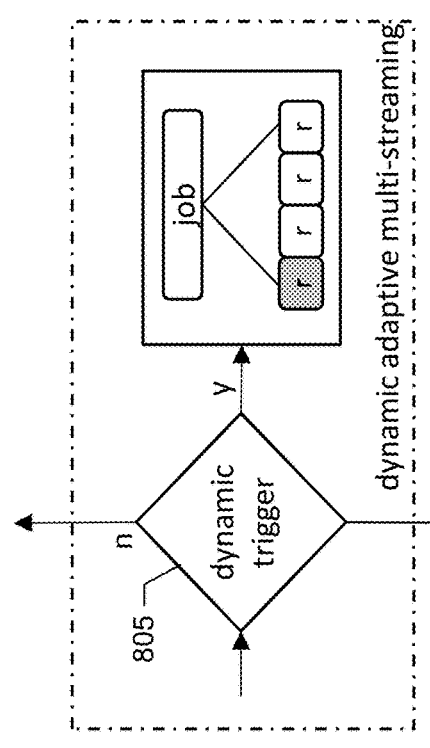
FIG. 7 shows an example of a threshold map for a copy subsystem, according to one or more embodiments.

FIG. 7 shows an example of a threshold map for a copy subsystem. The multi-streamed solution subsystem refers to or consults a threshold map, which maintains the threshold value for system and subsystem resources, to determine whether the resource utilization is low enough to engage multi-streaming. The resources in the threshold map are subsystem specific. For example, the cloud migration copy subsystem accounts for network bandwidth, whereas the metadata verify subsystem does not list network bandwidth as a consumed resource, as metadata is accessed locally for verification, and no or little activity is over the network.

As shown in the example of FIG. 7, the threshold map lists resources 705 (e.g., CPU, memory, network bandwidth, copy threads, and so forth), along with corresponding threshold values 710 for the resources below which multi-streaming is allowed (or above which multi-streaming is not allowed). In an embodiment, exceeding a threshold limit of any particular resource disqualifies the use of multi-streaming for the operation. For example, exceeding a threshold for CPU utilization, but not memory utilization may still disqualify the use of multi-streaming. In another embodiment, a weighted average may be used to determine whether or not multi-streaming is allowed. For example, depending on the operation, memory utilization may have more of an impact on a performance of the operation as compared to CPU utilization. Thus, memory as a resource may be given a greater weight as compared to CPU utilization when determining whether multi-streaming is allowed. It should be appreciated that any type of statistical analysis, computation, or formula may be applied to summarize resource usage when determining whether or not multi-streaming should be allowed.

Figure 8:
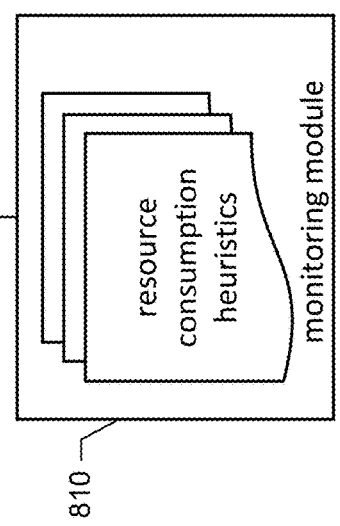
FIG. 8 shows a block diagram of a dynamic trigger for multi-streaming, according to one or more embodiments.

FIG. 8 shows a block diagram of a dynamic trigger 805 taking input from a monitoring module 810 to determine whether multi-streaming should be triggered. The dynamic trigger logic refers the monitoring module and threshold map to take decision on multi-streaming invocation. Multi-streaming is dynamically invoked if no resource consumption is higher than the pre-defined threshold. Depending upon subsystem design logic, in case of resource consumption being higher than threshold, the dynamic trigger may either be completely restrictive and provide feedback to the subsystem to refrain from processing any new multi-streaming request for a time period or till a signal is received; or fallback to single streamed processing which may adapt and dynamically invoke multi-streaming when resource consumption goes down. A subsystem logic may account for a level of resource load to determine the degree of multi-streaming. The trigger logic guarantees that multi-streaming is invoked only when system resources are underutilized, and multi-streaming invocation benefits outweigh the cost.

Table D below shows an example of pseudo code for the dynamic trigger.

TABLE D

```
procedure: dynamic_trigger(threashold_map,
            trigger)
begin
    trigger := true
    for i := 0 step + 1 until count-1 do
        begin
            get(threashold_map[i][0], usage)
            if usage > threashold_map[i][1] then
            begin
                trigger := false
                break
            end
        end
end
```

Table E below shows an example of pseudo code for a multi-streaming job.

TABLE E

```
procedure: multistreaming_job(file)
begin
    is_eligible := multistreming_eligible(file)
    if is_eligible then
    begin
        trigger := false
        dynamic_trigger(threshold_map, trigger)
        if trigger then
            begin
    comment mark_and_enqueue marks the region offsets as per
        slicing formula and enqueues the regions into
        subsystem queue.
        mark_and_enqueue(file, file->start_offset, file->end_offset)
    end
        else
            begin adaptive_processing(file) end
    end
end
```

Once triggered, the multi-streaming technique refers to or consults with the monitoring module and adapts as per change in resources consumption with the degree of multi-streaming being adjusted as per resource availability. The subsystem uses the dynamic trigger and adaptive logic to perform intra-region multi-streaming, where the region is sliced further to leverage idle resources like newly available streams. If system load increases, the subsystem refrains from engaging in intra-region multi-streaming. The adaptive multi-streaming abides by a minimum region size constraint and engages intra-region multi-streaming only if new regions to be created will be greater than the minimum region size allowed, acting as an anchor condition. The newly created regions are then enqueued back into a subsystem queue. Since each region receives a dedicated stream, having a minimum region size constraint helps to prevent generating an excessive number of streams.

Table F below shows an example of pseudo code for adaptive processing.

TABLE F

```
procedure: adaptive_processing(item)
begin
    current_offset := item->start_offset
    while current_offset < item->end_offset do
    begin
        process(item, current_offset, seek)
        trigger := false
```

TABLE F-continued

```
        dynamic_trigger(threshold_map, trigger)
        if trigger then
        begin
            mark_and_enqueue(item, current_offset + seek,
    item->end_offset)
            break
        end
        current_offset + seek
    end
end
```

For example, consider the multi-streamed copy subsystem for cloud migration, which in absence of adaptive logic misses on utilization of newly available resources. In an embodiment, systems and techniques for dynamic and adaptive multi-streaming refer to the monitoring module and use adaptive logic to engage intra-region multi-streaming as per availability of new resources with the degree of multi-streaming based on the degree of resources availability.

Figure 9:
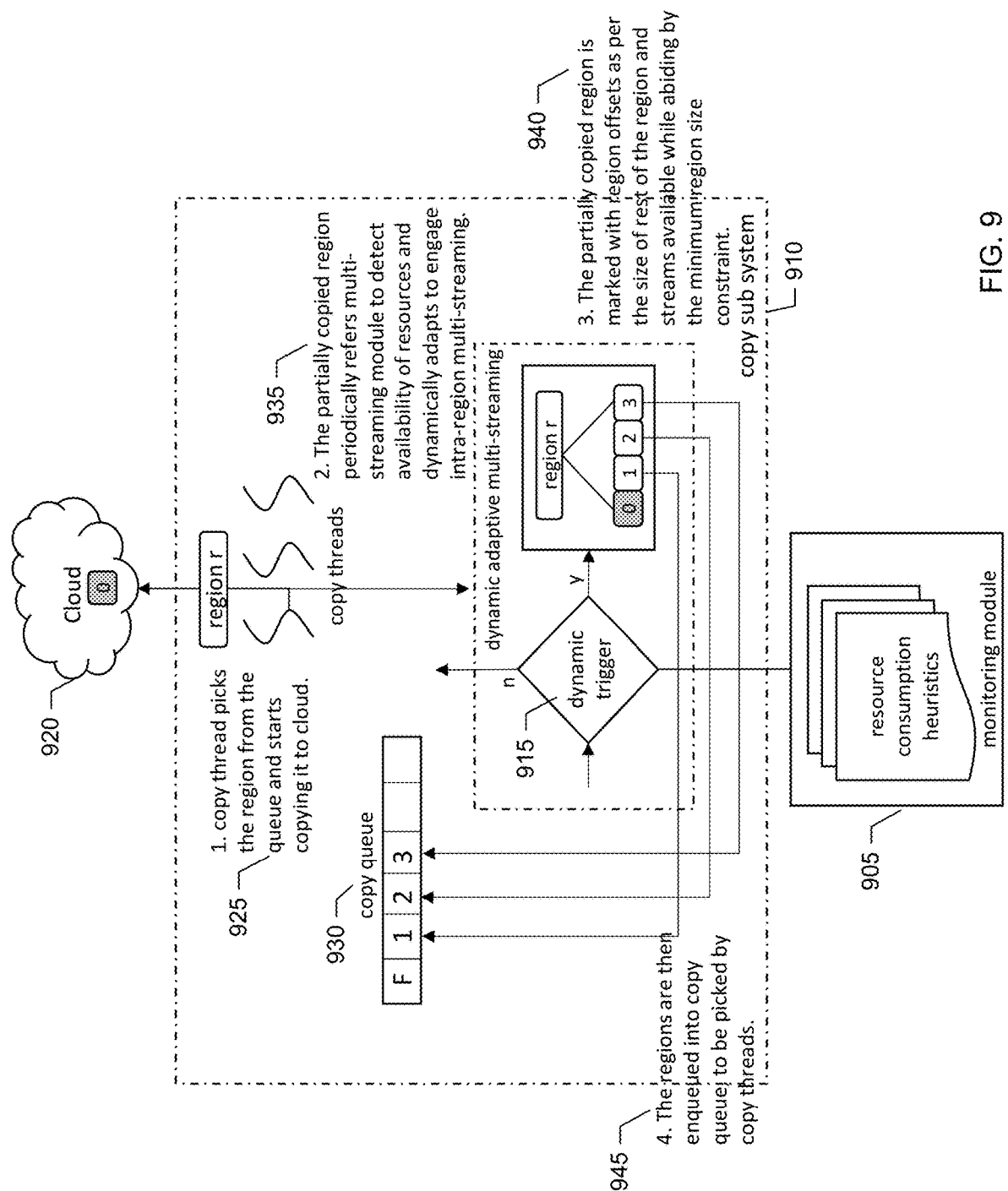
FIG. 9 shows an example of adaptive intra-region multi-streaming in a cloud migration workflow, according to one or more embodiments.

FIG. 9 shows a block diagram of adaptive intra-region multi-streaming for cloud migration. There is a monitoring module 905, copy subsystem 910, dynamic trigger 915 having dynamic adaptive multi-streaming, and cloud storage 920. In a first step 925, a copy thread picks or selects a region from a copy queue 930 and starts copying the region to the cloud. In a second step 935, the partially copied region periodically refers to the multi-streaming module to detect availability of resources and dynamically adapts to engage intra-region multi-streaming. In a third step 940, the partially copied region is marked with region offsets as per the second of the rest of the region and streams available while abiding by a minimum region size constraint. In a fourth step 945, the regions are then enqueued into the copy queue to be picked up by copy threads.

In an embodiment, a method includes dividing a file into a plurality of regions including first, second, and third regions; processing an operation on the first region of the file using a first thread; processing the operation the second region of the file using a second thread executing in parallel with the first thread; while the first and second threads are processing the first and second regions of the file, respectively, in parallel, determining that additional resources have become available; based on the additional resources having become available, dividing the third region into a plurality of subregions, a size of a subregion being smaller than a size of a region; processing the operation on a first subregion of the file using a third thread; and processing the operation on a second subregion of the file using a fourth thread, each of the first, second, third, and fourth threads executing in parallel with each other.

Embodiments take into account system resource utilization to determine invocation of multi-streaming thereby avoiding system resource exhaustion. The subsystem multi-streaming logic may refer to a specific resource consumption to provide feedback to a particular subsystem on prioritizing files. This can help reduce the load on the system. For example, in de-dup systems, migrating low generation data can lead to high network bandwidth utilization, while migrating high generation data can be more disk intensive. Files having low generation data and files having high generation data can be detected and the subsystem multi-streaming logic can provide feedback to a particular subsystem to prioritize high generation files when network bandwidth usage is high and low generation files when disk usage is high, thus reducing stress on a specific resource.

Embodiments can detect or distinguish files as having low generation data versus high generation data by, for example, examining file extensions, directory within which a file resides, metadata associated with the file, other characteristics, or combinations of these. For example, files having the extensions ".mdf" (master data file) and ".ldf" (log data file) are associated with SQL Server database files and are likely to have many changes between backups. In contrast, files having the extension ".sys" (Windows system file) are system files and as such are unlikely to change between backups. When, for example, a set of files to be operated on (e.g., migrate over a network to cloud storage) includes both low and high generation data and monitoring of the resources indicates high network utilization and low disk utilization, the multi-streaming logic may prioritize files having high generation data to migrate over files having low generation data in order to reduce the load on the network. Conversely, when monitoring of the resources indicates low network utilization and high disk utilization, the multi-streaming logic may prioritize migrating files having low generation data over files having high generation data in order to reduce the load on the storage disks.

In an embodiment, a method includes: identifying a set of files to be operated on by a subsystem, the set of files comprising files of a first type and files of a second type, the files of the first type placing a level of demand on a first resource that is greater than a level of demand on a second resource, and the files of the second type placing a level of demand on the first resource that is lower than a level of demand on the second resource; when there is high utilization of the first resource, prioritizing the files of the second type over the files of the first type; and when there is high utilization of the second resource, prioritizing the files of the first type over the files of the second type. The files of the first type may include low generation data. The files of the second type may include high generation data.

Embodiments take into account subsystem resource utilization to determine invocation of multi-streaming thereby avoiding subsystem resource exhaustion. The subsystem multi-streaming logic may refer to another dependent subsystem resource utilization to make a multi-streaming invocation decision. For example, in de-dup systems, for cloud migration workflows for metadata verification is performed for every file copied to the cloud. High generation files may complete a copy operation faster than a verify operation and multi-streaming invocation will generate a greater number of verification items compared to a single streamed migration as files are sliced into multiple regions which are migrated in parallel. This may cause a bottleneck in the verify subsystem and affect the copy subsystem as well. Embodiments account for the dependent verify subsystem load while making a decision for multi-streaming in the copy subsystem, thus mitigating the migration subsystem exhaustion problem.

Embodiments of the dynamic and adaptive multi-streaming technique can be used to enhance various multi-stream optimization solutions such as file replication between two systems, restoration from a backup appliance, migration to a cloud tier, restoration from the cloud tier, metadata integrity verification, and others.

For example, multi-streaming for restoration from the cloud requires recalling the migrated files back to active local storage. Embodiments of the dynamic and adaptive multi-streaming technique can be used to help provide faster recall performance with multi-streaming while dynamically adapting as per resource consumption.

Figure 10:
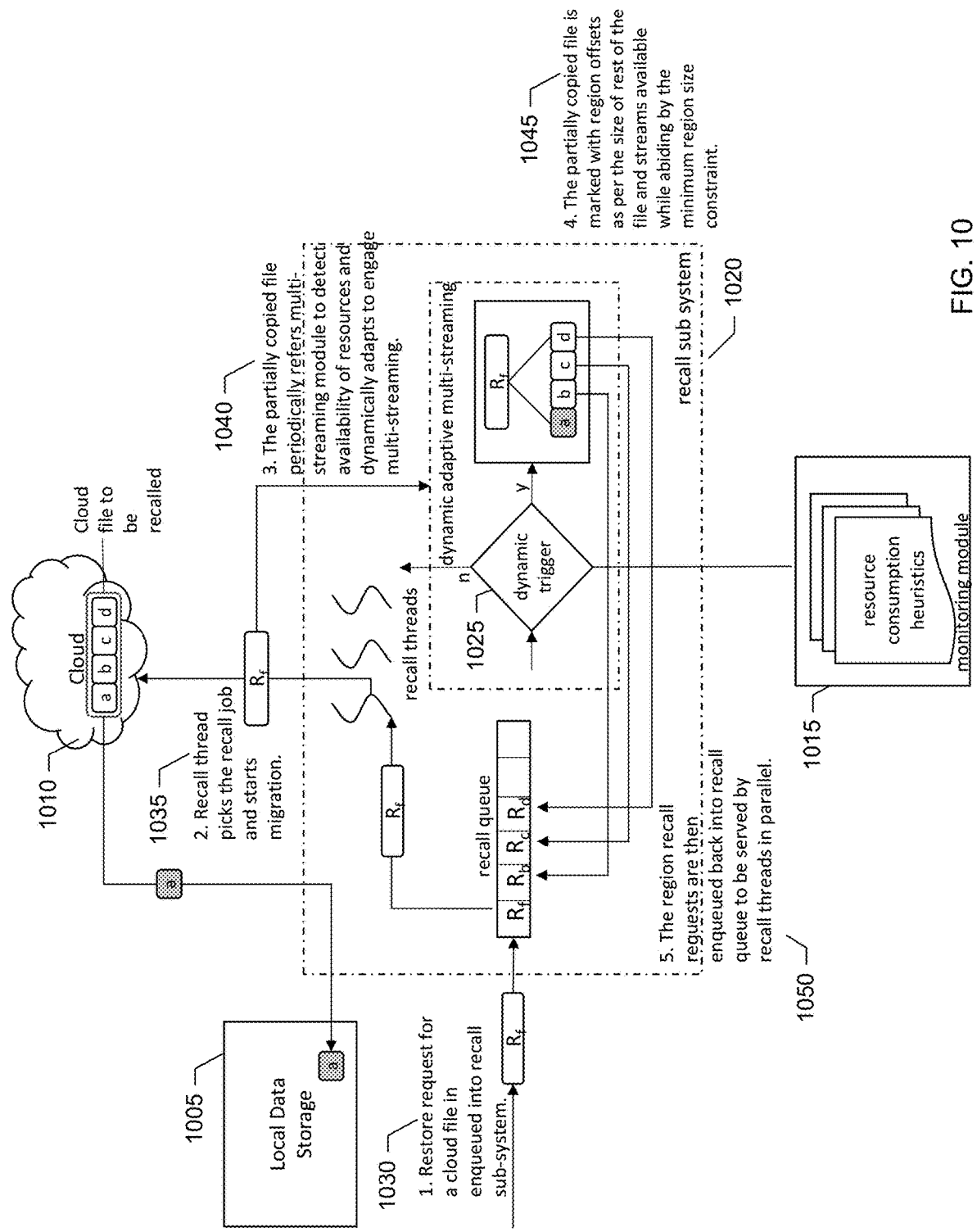
FIG. 10 shows an example of dynamic and adaptive multi-streaming for a recall workflow, according to one or more embodiments.

FIG. 10 shows a block diagram for dynamic and adaptive multi-streaming when used on a recall operation (e.g., recalling files migrated to cloud storage back to the data storage backup appliance). There is a local data storage 1005, cloud storage 1010 having a file to be recalled to the local data storage, monitoring module 1015, recall subsystem 1020, and dynamic trigger 1025.

In a first step 1030, a recall request for a cloud file is enqueued into the recall subsystem. In a second step 1035, a recall thread picks the recall job and starts the migration from the cloud back to the local data storage. In a third step 1040, the partially copied file periodically refers to the multi-streaming module to detect availability of resources and dynamically adapts to engage multi-streaming. In a fourth step 1045, the region recall requests are then enqueued back into the recall queue to be served by recall threads in parallel. In a fifth step 1050, the region recall requests are then enqueued back into the recall queue to be served by recall threads in parallel.

In an embodiment, systems and techniques include the continuous monitoring of system and subsystem resource utilization to provide heuristics or utilization measurements while dynamically triggering multi-streaming to avoid system overloading and bottlenecks in multi-streamed solutions with adaptive intra-region multi-streaming to leverage newly available system resources.

The resource exhaustion problem is more noticeable in certain use cases like multi-streaming in a cloud tier migration, which differs from that of the active tier use case as cloud latencies are unpredictable, and a slow cloud can severely aggravate the system load caused by multi-streaming. The need for dynamic and adaptive multi-streaming solution is more evident for high variation workflow like cloud and can be satisfied using the techniques as described.

Principles and aspects of dynamic and adaptive multi-streaming solution can be extended to any divide and conquer-based parallel processing solution, where the monitoring module and dynamic trigger can be modeled as per solution design requirements, to monitor specific trigger parameters enabling decision making for parallelization.

Figure 11A:
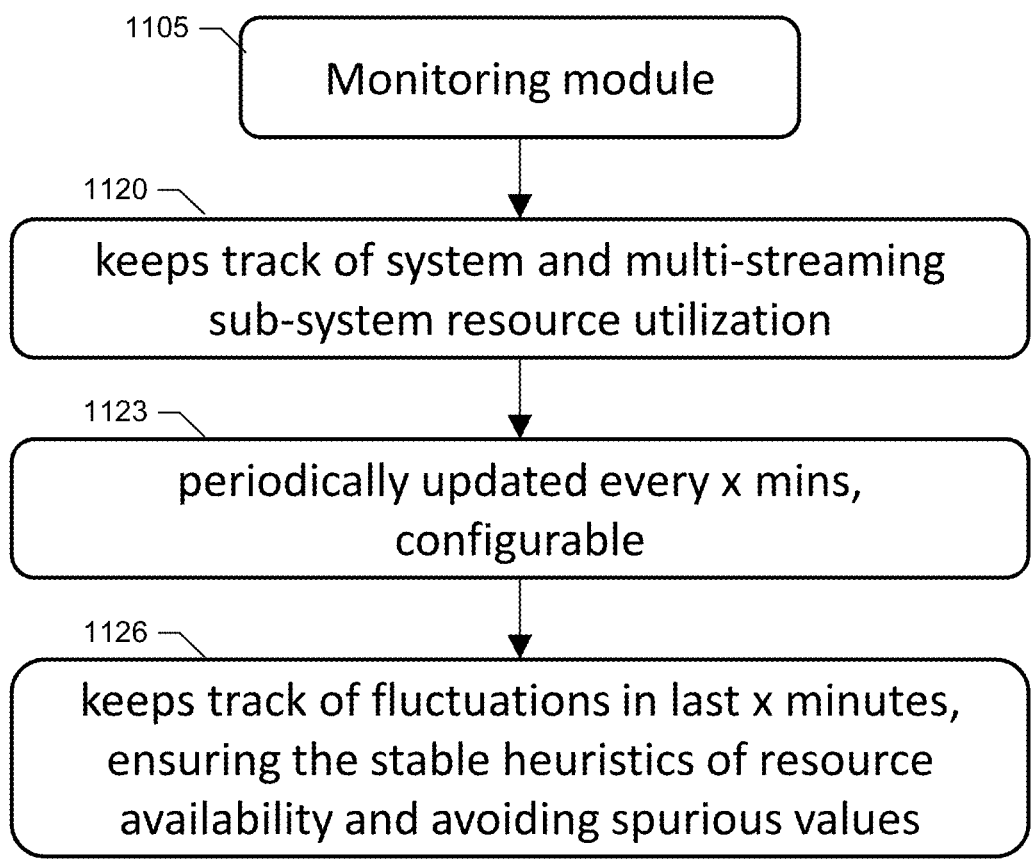
FIG. 11A shows a component level flow, according to one or more embodiments.
Figure 11B:
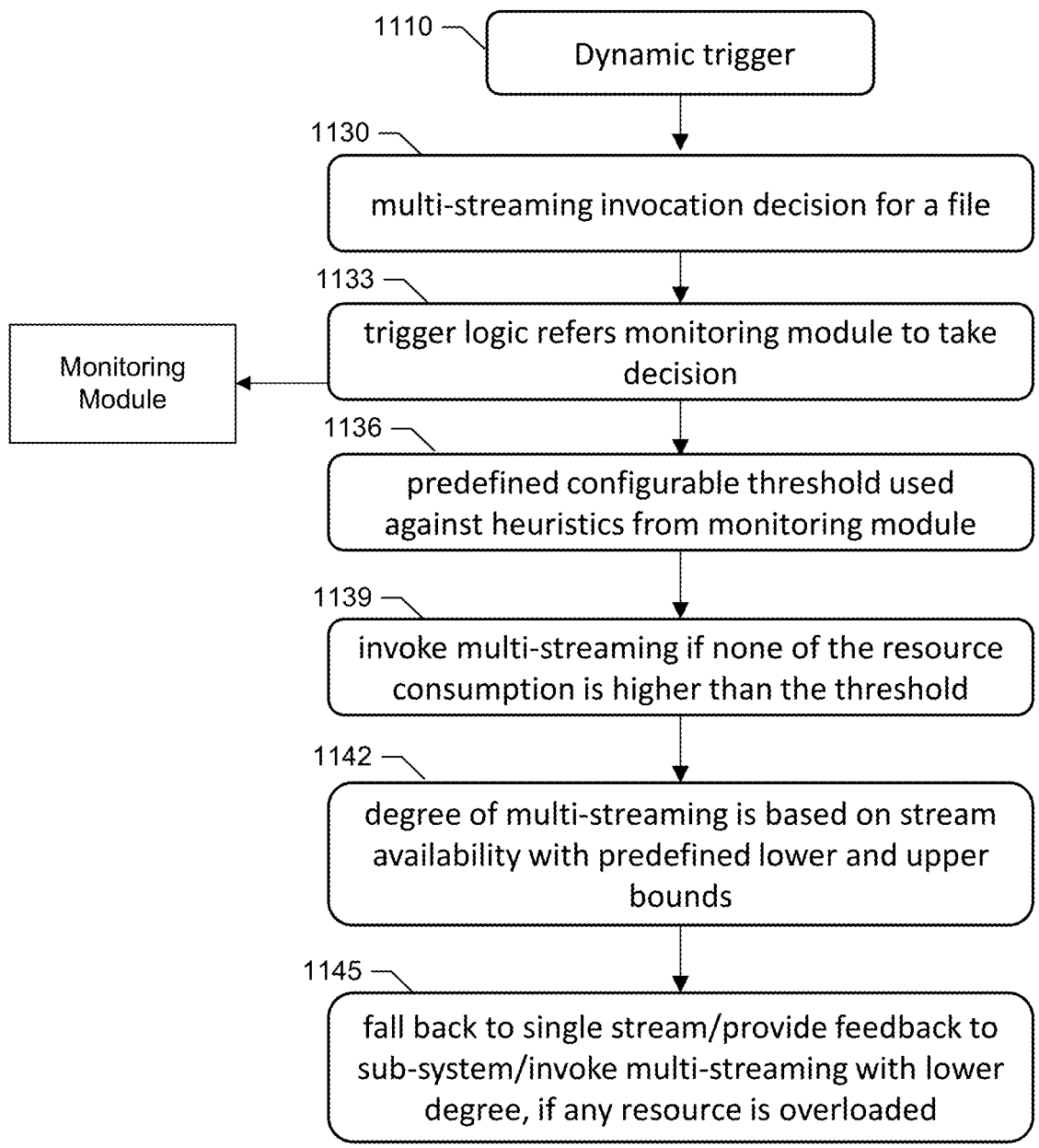
FIG. 11B shows another component level flow, according to one or more embodiments.
Figure 11C:
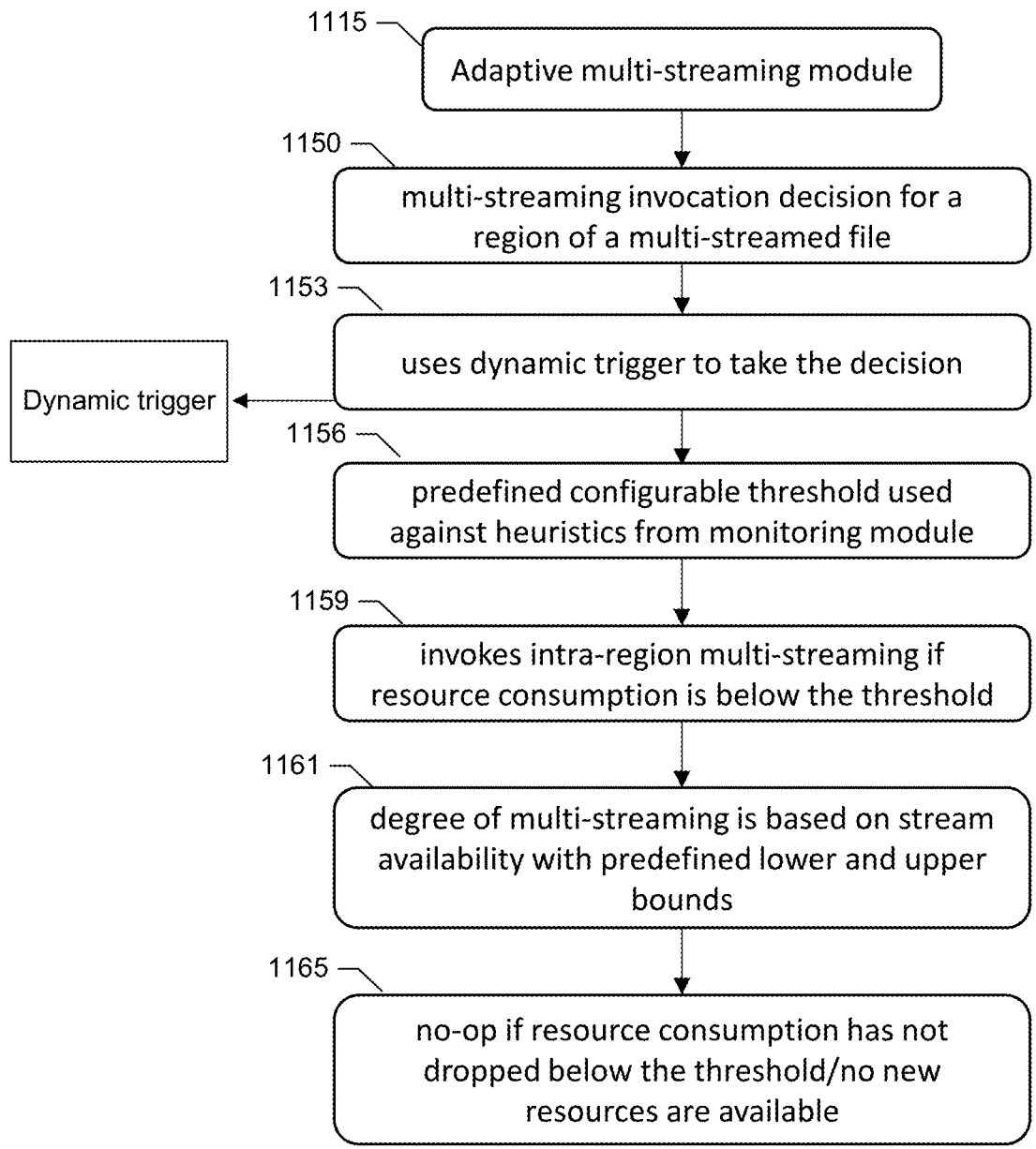
FIG. 11C shows another component level flow, according to one or more embodiments.

FIGS. 11A-C shows component level flow diagrams for dynamic and adaptive multi-streaming in a deduplicated storage system. As discussed, the components include a monitoring module 1105, dynamic trigger 1110, and adaptive multi-streaming module 1115. In a step 1120, the monitoring module keeps track of system and multi-streaming subsystem resource utilization using one or more resource consumption matrices. In a step 1123, the monitoring module updates the resource consumption matrix at periodic intervals. In a step 1126, the monitoring module keeps track of fluctuations thereby helping to ensure the heuristics or metrics indicating resource availability are stable and avoiding spurious values.

The duration of an interval can be configured such as by an administrator user of the backup storage appliance. For example, the interval may be configured as every 1, 2, 3, 4, or 5 minutes or any other time period as desired. Sampling too frequently can impose an undesirable level of additional overhead on the system. Sampling too infrequently, however, can result in stale resource utilization data. The system is flexible and allows individual administrators to determine what might be most appropriate for their organization.

In a step 1130 (FIG. 11B), the dynamic trigger makes a multi-streaming invocation decision for a file. In a step 1133, the dynamic trigger consults with the monitoring module to make the decision. In a step 1136, predefined configurable thresholds associated with a particular operation are used against the heuristics or resource utilization data collected by the monitoring module. In a step 1139, multi-streaming is invoked if none of the resource consumption metrics is higher than the thresholds. For example, a determination of resource underutilization may result in the file being divided into a set of regions so that separate streams can process the regions in parallel. A determination of resource overutilization may result in the file not being divided and instead being processed as a single region using a single stream.

In a step 1142, a degree of multi-streaming is based on stream availability. There can be predefined lower and upper bounds. Multi-streaming, as discussed, includes dividing a file into a number of regions so that each region is processed by a thread while another region is being processed by another thread in parallel. Increasing the number of regions can thereby increase the number of threads processing in parallel. In an embodiment, the number of regions that a file is divided into can vary based on the degree of resource availability or resource utilization. For example, the number of regions that a file is divided into when resource utilization is low may be greater than the number of regions that the file is divided into when resource utilization is high.

In a step 1145, the dynamic trigger falls back to a single stream, provides feedback concerning resource utilization to the subsystem, invokes multi-streaming with a lower degree (e.g., fewer streams and file regions), or combinations of these if any resource is overloaded or overutilized.

In a step 1150 (FIG. 11C), the adaptive multi-streaming module makes an invocation decision for a region of a multi-streamed file. In a step 1153, the adaptive multi-streaming module consults with the dynamic trigger to make the decision. In a step 1156, the adaptive multi-streaming module uses predefined configurable thresholds against heuristics or resource utilization data from the monitoring module. In a step 1159, the adaptive multi-streaming module invokes intra-region multi-streaming if resource consumption is below the thresholds. In a step 1161, the degree of multi-streaming is based on stream availability with predefined lower and upper bounds. In a step 1165, the adaptive multi-streaming module maintains the status quo if resource consumption has not dropped below threshold or no new resources are available.

For example, a file may have initially been divided into a set of regions to be processed in parallel based on resource availability at an initial time. After the initial time, there may be a change in resource availability such that new resources are made available. In this case, the adaptive multi-streaming module can take advantage of the newly available resources by further dividing a region into multiple subregions thereby allowing additional threads for processing the subregions in parallel.

Figure 12:
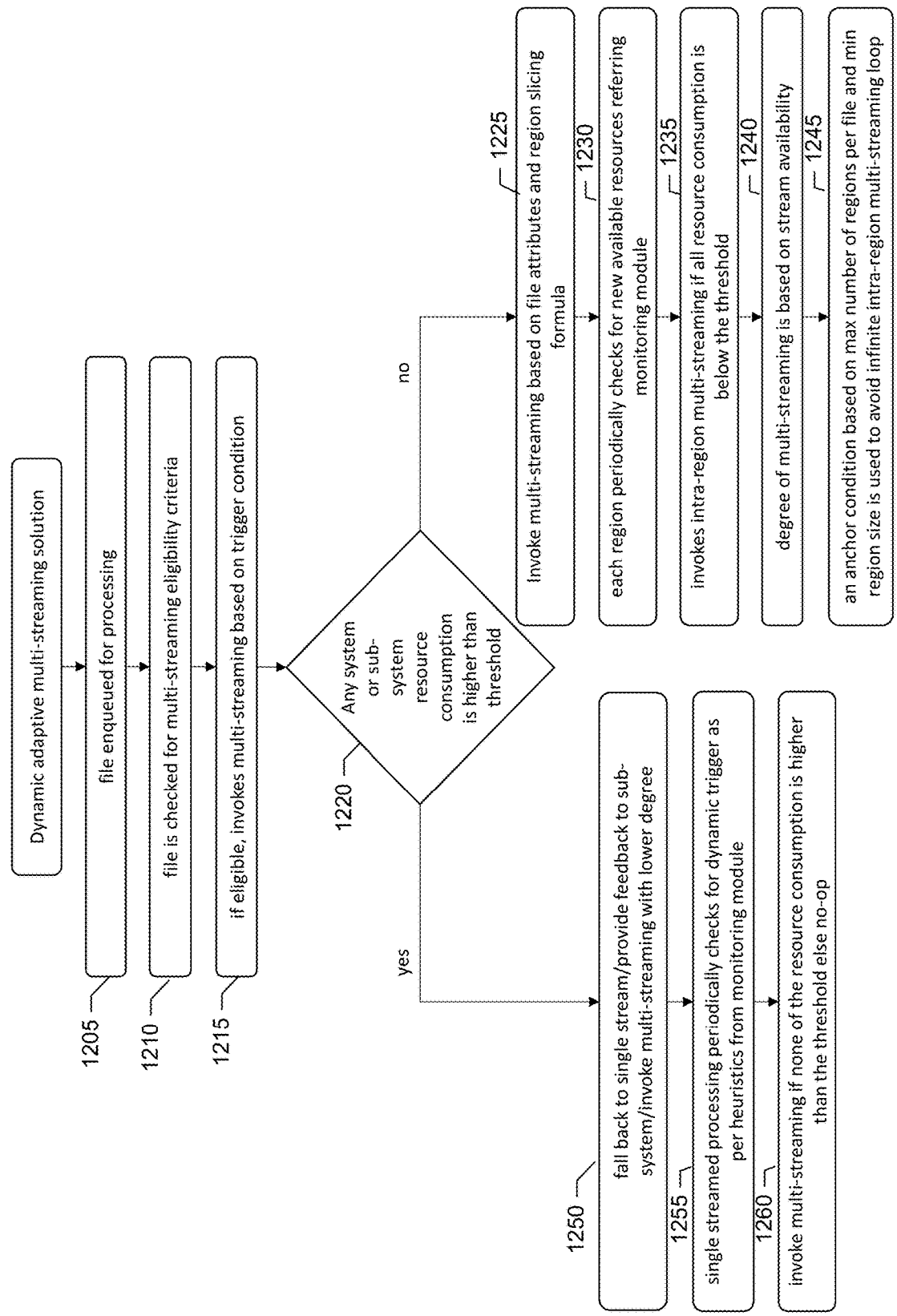
FIG. 12 shows a flow for dynamic and adaptive multi-streaming, according to one or more embodiments.

FIG. 12 shows an overall flow for dynamic adaptive multi-streaming. In a step 1205, a file is enqueued for processing. In a step 1210, the file is checked for multi-streaming eligibility criteria. In a step 1215, if the file is eligible, multi-streaming is invoked based on a trigger condition. In a step 1220, an assessment is made concerning whether any system or subsystem resource consumption is higher than a threshold. If not (e.g., resources underutilized), in a step 1225, multi-streaming is invoked based on file attributes and a region slicing formula. In a step 1230, each region (or process associated with a region) periodically checks for any new available resource by consulting with the monitoring module. In a step 1235, intra-region multi-streaming is invoked if all resource consumption is below the threshold. In a step 1245, a degree of multi-streaming is based on stream availability. In a step 1240, there is an anchor condition based on a maximum number of regions per file and a minimum region size is used to avoid an infinite intra-region multi-streaming loop.

If resource consumption is higher than the threshold (e.g., resources overutilized), in a step 1250, a fallback is made to a single stream for processing, feedback is provided to the subsystem regarding resource over utilization, multi-streaming is invoked with a lower degree (e.g., number of parallel streams reduced), or combinations of these. In a step 1255, a single streamed processing component periodically checks with the dynamic trigger as per heuristics or resource utilization data collected from the monitoring module. In a step 1260, multi-streaming is invoked if consumption of resources is not higher than the thresholds.

Figure 13:
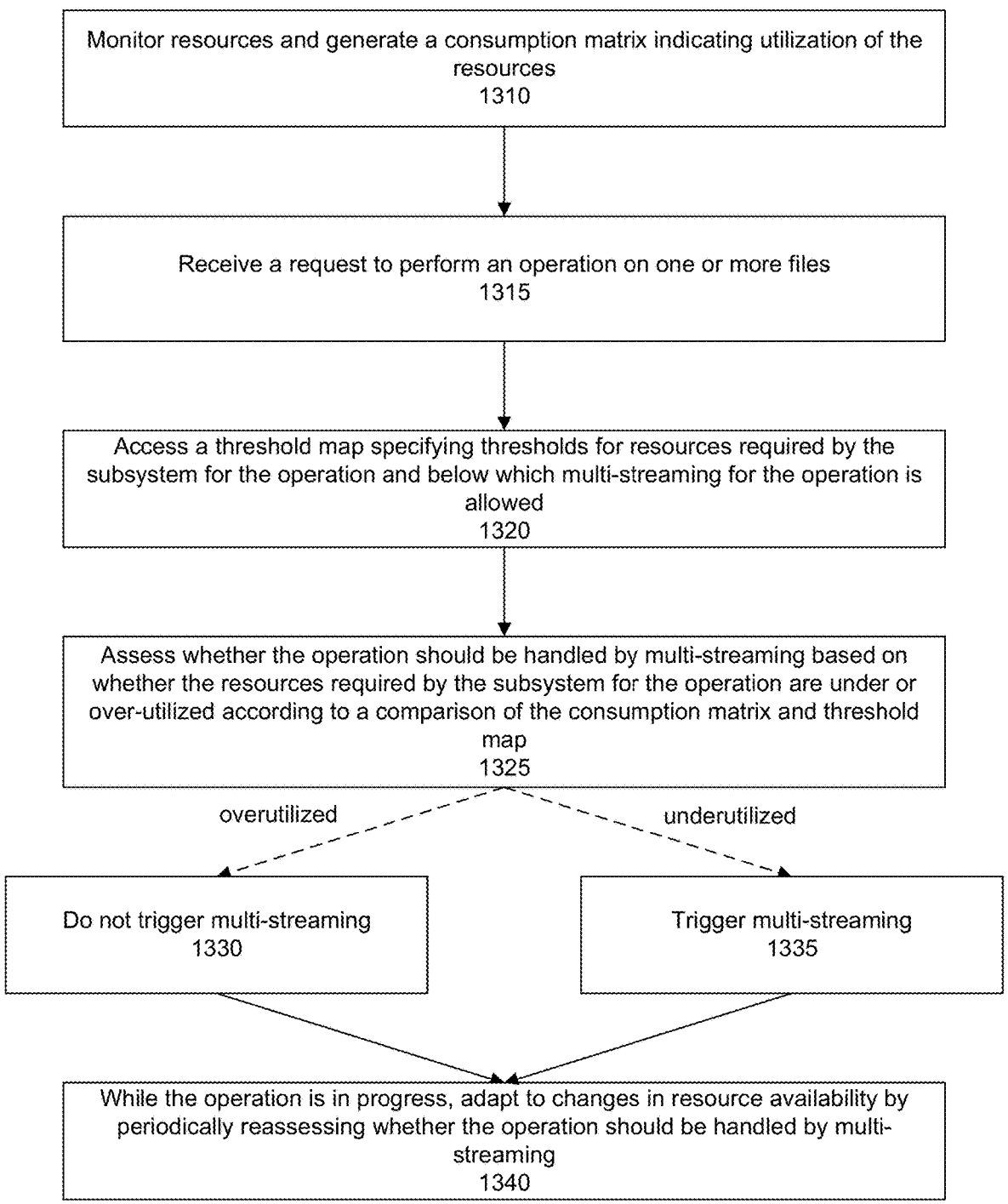
FIG. 13 shows another overall flow for dynamic and adaptive multi-streaming, according to one or more embodiments.

FIG. 13 shows another flow for dynamic and adaptive multi-streaming. In a step 1310, resources of a backup data storage appliance are monitored and one or more consumption matrices are generated indicating utilization of the resources. The consumption matrix includes a listing of resources such as CPU, memory, network bandwidth, disk bandwidth, and so forth along with corresponding metrics indicating utilization.

In a step 1315, a request is received for a subsystem to perform an operation on one or more files stored or managed by the backup data storage appliance. The requested operation may include, for example, a request to migrate or copy the files from the backup data storage appliance to cloud storage, replicate the files from the backup data storage appliance to another backup storage appliance, conduct a verification of the files, or any other operation.

In a step 1320, a threshold map is accessed specifying thresholds for resources required by the subsystem for the operation and below which multi-streaming for the operation is allowed. As discussed, the threshold map is specific to the particular subsystem and thus particular operation because different operations place different demands on different types of resources.

In a step 1325, an assessment is made as to whether the operation should be handled by multi-streaming based on whether the resources required by the subsystem for the operation are under or overutilized according to a comparison of the consumption matrix and the threshold map associated with the subsystem. As discussed, the consumption matrix lists the resources and corresponding utilization for each resource. The threshold map lists the resources required by the subsystem for the operation. The resources listed in the threshold map may be a subset of the resources listed in the consumption matrix. Along with each resource listed in the threshold map is a threshold value. In an embodiment, if a utilization value for any resource is above or greater than a threshold value of a corresponding resource as listed in the threshold map, a determination is made that the resources are overutilized and multi-streaming is not triggered (step 1330). If, however, each utilization value for each resource listed in the threshold map is below the corresponding resource threshold value, a determination is made that the resources are underutilized and multi-streaming is invoked (step 1335).

In a step 1340, the while the operation is in progress, changes in resource availability are adapted to by conducting periodic reassessments throughout the operation to determine whether the operation should be handled by multi-streaming.

Figure 14:
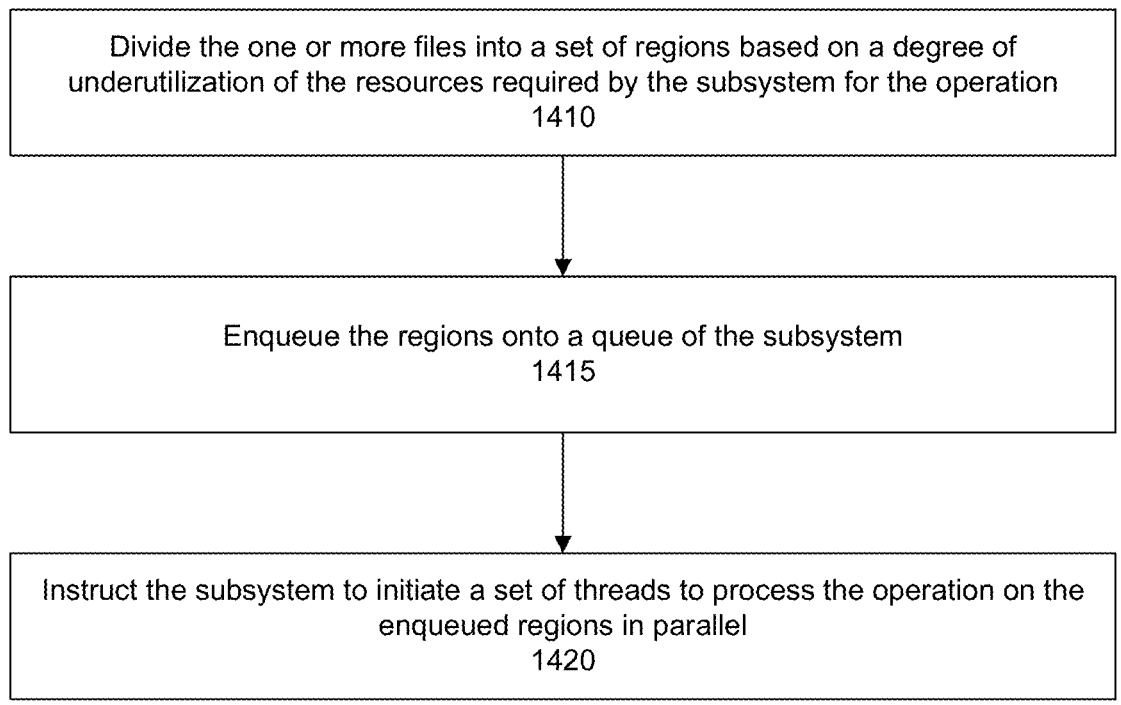
FIG. 14 shows a flow for dividing a file into regions for multi-streaming, according to one or more embodiments.

FIG. 14 shows a flow for handling operations on files when a determination has been made that multi-streaming is allowed. In a step 1410, the one or more files are divided into a set of regions based on a degree of underutilization of the resources required by the subsystem for the operation.

The degree of underutilization may be determined by calculating a difference between current utilization of a resource as captured in the consumption matrix and a threshold value of the resource as specified in the threshold map. Thus, the degree or number of threads executing in parallel is kept proportional to the underutilization, where underutilization is based on current utilization and the threshold. In an embodiment, a technique calculates what percentage of threshold is the current utilization and then invokes multi-streaming with that degree. Consider, as an example, a resource with 80 percent threshold is at 10 percent of total utilization, i.e., 12.5 percent of threshold. Thus underutilization is 87.5 percent, so the multi-streaming can be done with dividing the file with 87 percent of maximum regions that can be created. Regions directly proportional to underutilization may be calculated as follows:

$$\text{regions} = ((100 - (\text{resource utilization percentage/threshold percentage}) * 100)/100) * \text{max regions possible.}$$
$$= ((100 - (10/80) * 100)/100) * 10$$
$$= ((100 - 12.5)/100) * 10$$
$$= 87.5/100 * 10$$
$$= \sim 8$$

In a step 1415, the regions are enqueued onto a queue of the subsystem.

In a step 1420, the subsystem is instructed to initiate a set of threads to process the operation on the enqueued regions in parallel.

Figure 15:
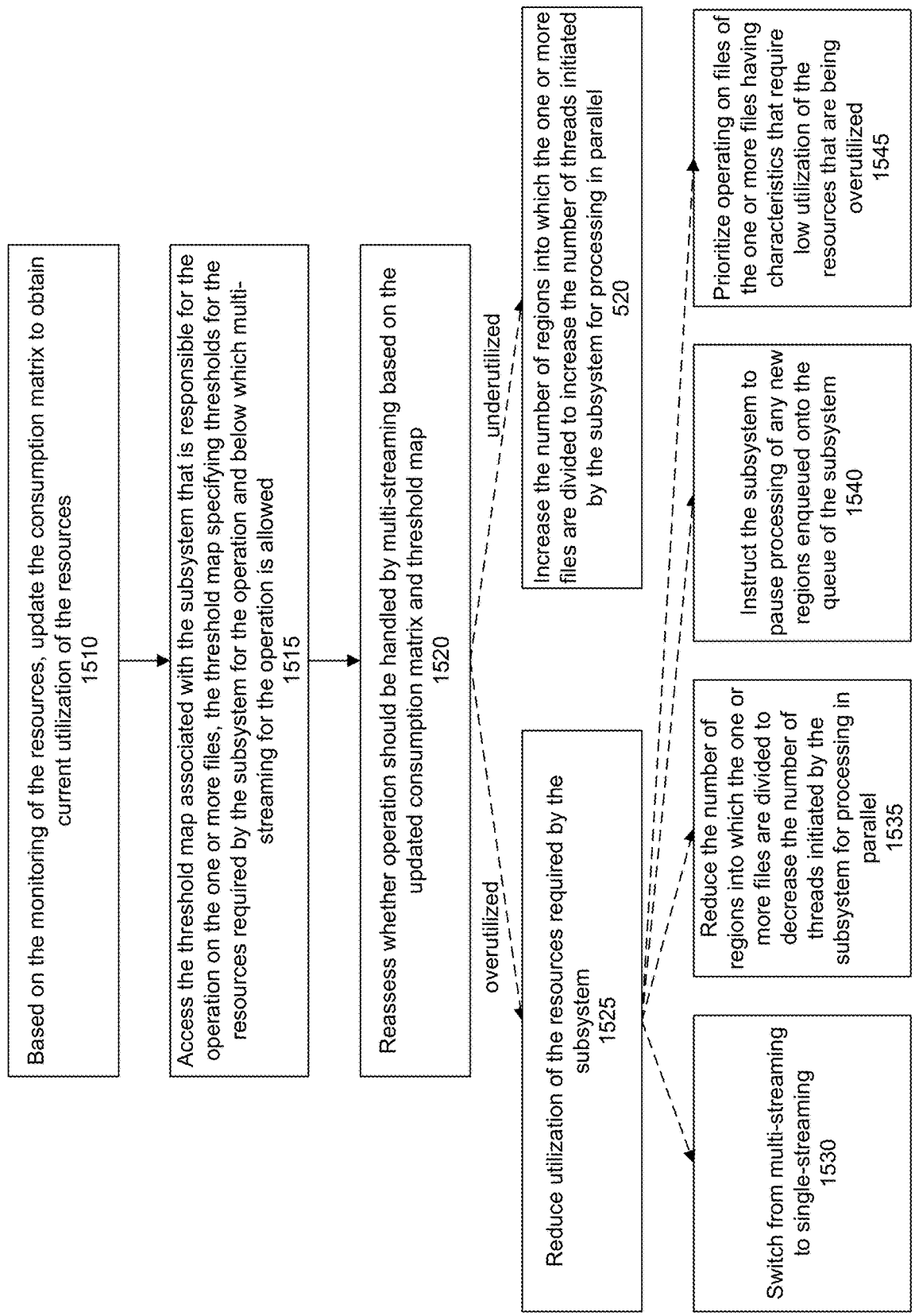
FIG. 15 shows a flow for adaptive multi-streaming, according to one or more embodiments.

FIG. 15 shows a flow for reassessing throughout the operation whether multi-streaming should be allowed and thus adapt to changes in resource availability. In a step 1510, based on the monitoring of the resources, the consumption matrix is updated to obtain current utilization metrics of the resources.

In a step 1515, the threshold map is again accessed. As discussed, the threshold map is associated with the subsystem that is responsible for the operation on the files and specifies thresholds for the resources required by the subsystem for the operation and below which multi-streaming for the operation is allowed.

In a step 1520, a reassessment is made as to whether the operation should be handled by multi-streaming based on the updated consumption matrix and threshold map.

If the reassessment indicates that there is an overutilization of any of the resources required by the subsystem, utilization of the resources is reduced (step 1525). Reducing utilization of the resources includes one or more of switching from multi-streaming to single-streaming streaming (step 1530), reducing the number of regions into which the files are divided to decrease the number of threads initiated by the subsystem for processing in parallel (step 1535), instructing the subsystem to pause processing of any new regions enqueued onto the queue of the subsystem (step 1540), or prioritizing operating on files having characteristics that require low utilization of the resources that are being overutilized (step 1545).

Selecting an option for reducing resource utilization may be subsystem specific. Some subsystems can be more restrictive depending upon criticality of exhausting the resource and may choose to completely pause, while other subsystems may simply fall back to single streaming. In the example of cloud tier migration, the copy subsystem may take into account the verify subsystem load to pause itself in order to avoid getting bottlenecked, but the same may not applicable for the verify subsystem as there is no next phase where it may experience the same problem.

The identification of files that would result in lowering the resource consumption can be accomplished by estimating the required value and maintaining heuristics or metrics. For example, if network bandwidth is close to exhaustion, the adaptive multi-streaming module may prioritize high generation files that would result in high de-dup on the cloud and low network utilization. The priority of a file in such case will be directly proportional to estimated de-dup on the cloud. Below is an example of an algorithm for determining prioritization.

$$P(f) \propto E_{cd}(f)$$

Where estimation is done based on set of parameters, such as current cloud dedup, historically observed average dedup for files with similar generation, size, type, etc.

$$E_p(f) = \sum_{i=0}^{n} W_i H_p(f, a_i)$$

where, $E_p(f)$–estimation of parameter $p$ for file $f$ $n$–total number of file attribute inputs for estimation $W_i$–estimation weight for $i^{th}$ file attribute $H_p(f, a_i)$–average value of parameter "$p$" for the given file "$f$" as per $ith$ file or system attribute "$a$"

The historical values can be maintained for each file migrated to cloud.

$$H_p(f, a) = M(p, a, f)$$

where, $H_p(f, a)$–average value of parameter "$p$" for the given file "$f$" as per file–attribute "$a$"

$M$–3–dimensional matrix with heuristic statistics $p$–parameter $a$–file attribute $f$–file for which heuristics need to be fetched In an embodiment, a method includes: monitoring a plurality of resources in a deduplicated storage appliance to generate a consumption matrix indicating utilization of the resources; accessing a threshold map associated with a subsystem, the subsystem being responsible for an operation involving one or more files managed by the deduplicated storage appliance, and the threshold map specifying thresholds for resources required by the subsystem for the operation and below which multi-streaming for the operation is allowed; assessing whether the operation should be handled by multi-streaming, the assessing comprising determining whether the resources required by the subsystem for the operation are underutilized or overutilized based on the consumption matrix and the threshold map; when the resources required by the subsystem for the operation are overutilized, not triggering multi-streaming; and when the resources required by the subsystem for the operation are underutilized, triggering multi-streaming comprising: dividing the one or more files into a plurality of regions; enqueuing the regions onto a queue of the subsystem; and instructing the subsystem to initiate a plurality of threads to process the enqueued regions in parallel; and while the enqueued regions are being processed in parallel, periodically updating the consumption matrix and reassessing whether the operation should be handled by multi-streaming.

Reassessing whether the operation should continue to be handled by multi-streaming may include determining whether the resources required by the subsystem for the operation are underutilized or overutilized based on the updated consumption matrix and the threshold map, and the method may further include: when the reassessment indicates that the resources are underutilized, increasing a number of regions into which the one or more files are divided to increase a number of plurality of threads initiated by the subsystem for processing the enqueued regions in parallel.

Reassessing whether the operation should continue to be handled by multi-streaming may include determining whether the resources required by the subsystem for the operation are underutilized or overutilized based on the updated consumption matrix and the threshold map, and the method may further include: when the reassessment indicates that the resources are overutilized, reducing utilization of the resources required by the subsystem, the reducing comprising reducing a number of regions into which the one or more files are divided to decrease a number of the plurality of threads initiated by the subsystem for processing the enqueued regions in parallel.

Reassessing whether the operation should continue to be handled by multi-streaming may include determining whether the resources required by the subsystem for the operation are underutilized or overutilized based on the updated consumption matrix and the threshold map, and the method may further include: when the reassessment indicates that the resources are overutilized, reducing utilization of the resources required by the subsystem, the reducing comprising instructing the subsystem to pause processing of any new regions enqueued onto the queue.

Reassessing whether the operation should continue to be handled by multi-streaming may include determining whether the resources required by the subsystem for the operation are underutilized or overutilized based on the updated consumption matrix and the threshold map, and the method may further include: when the reassessment indicates that the resources are overutilized, reducing utilization of the resources required by the subsystem, the reducing comprising prioritizing selection of files from the one or more files having characteristics that require low utilization of the resources that are overutilized.

In an embodiment, a number of the plurality of regions into which the one or more files is divided is based on a degree of the underutilization.

In an embodiment, there is a system comprising: a processor; and memory configured to store one or more sequences of instructions which, when executed by the processor, cause the processor to carry out the steps of: monitoring a plurality of resources in a deduplicated storage appliance to generate a consumption matrix indicating utilization of the resources; accessing a threshold map associated with a subsystem, the subsystem being responsible for an operation involving one or more files managed by the deduplicated storage appliance, and the threshold map specifying thresholds for resources required by the subsystem for the operation and below which multi-streaming for the operation is allowed; assessing whether the operation should be handled by multi-streaming, the assessing comprising determining whether the resources required by the subsystem for the operation are underutilized or overutilized based on the consumption matrix and the threshold map; when the resources required by the subsystem for the operation are overutilized, not triggering multi-streaming; and when the resources required by the subsystem for the operation are underutilized, triggering multi-streaming comprising: dividing the one or more files into a plurality of regions; enqueuing the regions onto a queue of the subsystem; and instructing the subsystem to initiate a plurality of threads to process the enqueued regions in parallel; and while the enqueued regions are being processed in parallel, periodically updating the consumption matrix and reassessing whether the operation should be handled by multi-streaming.

In another embodiment, there is a computer program product, comprising a non-transitory computer-readable medium having a computer-readable program code embodied therein, the computer-readable program code adapted to be executed by one or more processors to implement a method comprising: monitoring a plurality of resources in a deduplicated storage appliance to generate a consumption matrix indicating utilization of the resources; accessing a threshold map associated with a subsystem, the subsystem being responsible for an operation involving one or more files managed by the deduplicated storage appliance, and the threshold map specifying thresholds for resources required by the subsystem for the operation and below which multi-streaming for the operation is allowed; assessing whether the operation should be handled by multi-streaming, the assessing comprising determining whether the resources required by the subsystem for the operation are underutilized or overutilized based on the consumption matrix and the threshold map; when the resources required by the subsystem for the operation are overutilized, not triggering multi-streaming; and when the resources required by the subsystem for the operation are underutilized, triggering multi-streaming comprising: dividing the one or more files into a plurality of regions; enqueuing the regions onto a queue of the subsystem; and instructing the subsystem to initiate a plurality of threads to process the enqueued regions in parallel; and while the enqueued regions are being processed in parallel, periodically updating the consumption matrix and reassessing whether the operation should be handled by multi-streaming.

In another embodiment, there is a method comprising: monitoring a plurality of resources to generate a consumption matrix indicating utilization of the resources; accessing a threshold map associated with a subsystem, the subsystem being responsible for an operation involving one or more files, and the threshold map specifying thresholds for resources required by the subsystem for the operation and below which multi-streaming for the operation is allowed; assessing whether the operation should be handled by multi-streaming, the assessing comprising determining whether the resources required by the subsystem for the operation are underutilized or overutilized based on the consumption matrix and the threshold map; when the assessment indicates that the subset of resources are overutilized, not triggering multi-streaming; and when the assessment indicates that the subset of resources are underutilized, triggering multi-streaming comprising: dividing the one or more files into a plurality of regions based on a degree of underutilization; enqueuing the regions onto a queue of the subsystem; and instructing the subsystem to initiate a plurality of threads to process the enqueued regions in parallel; while the enqueued regions are being processed in parallel, updating the consumption matrix; reassessing whether the operation should be handled by multi-streaming, the reassessing comprising determining whether the resources required by the subsystem for the operation are underutilized or overutilized based on the updated consumption matrix and the threshold map; when the reassessment indicates that the resources are underutilized, increasing a number of regions into which the one or more files are divided to increase a number of plurality of threads initiated by the subsystem for processing the enqueued regions in parallel; and when the reassessment indicates that the resources are overutilized, reducing utilization of the resources by the subsystem, the reducing comprising at least one of reducing the number of regions into which the one or more files are divided to decrease the number of the plurality of threads initiated by the subsystem for processing the enqueued regions in parallel, instructing the subsystem to pause processing of any new regions enqueued onto the queue, or prioritizing files of the one or more files to be operated on having characteristics that require low utilization of the resources that are overutilized.

Figure 16:
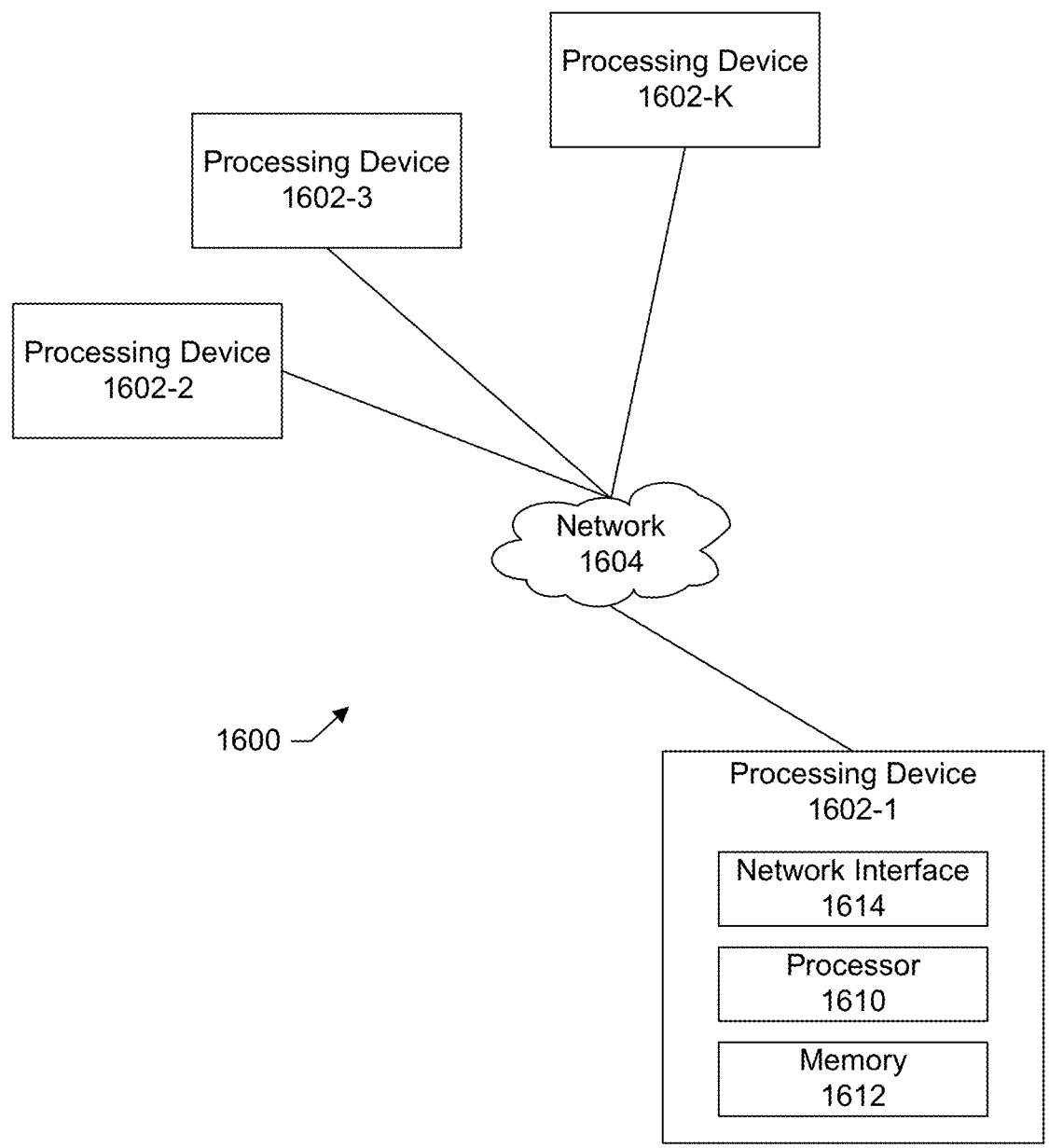
FIG. 16 shows a block diagram of a processing platform that may be utilized to implement at least a portion of an information processing system, according to one or more embodiments.

FIG. 16 shows an example of a processing platform 1600 that may include at least a portion of the information handling system shown in FIG. 1. The example shown in FIG. 16 includes a plurality of processing devices, denoted 1602-1, 1602-2, 1602-3 . . . 1602-K, which communicate with one another over a network 1604.

The network 1604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1602-1 in the processing platform 1600 comprises a processor 1610 coupled to a memory 1612.

The processor 1610 may comprise a microprocessor, a microcontroller, an application-specific integrated circuit (ASIC), a field-programmable gate array (FPGA) or other type of processing circuitry, as well as portions or combinations of such circuitry elements.

The memory 1612 may comprise random access memory (RAM), read-only memory (ROM) or other types of memory, in any combination. The memory 1612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 17:
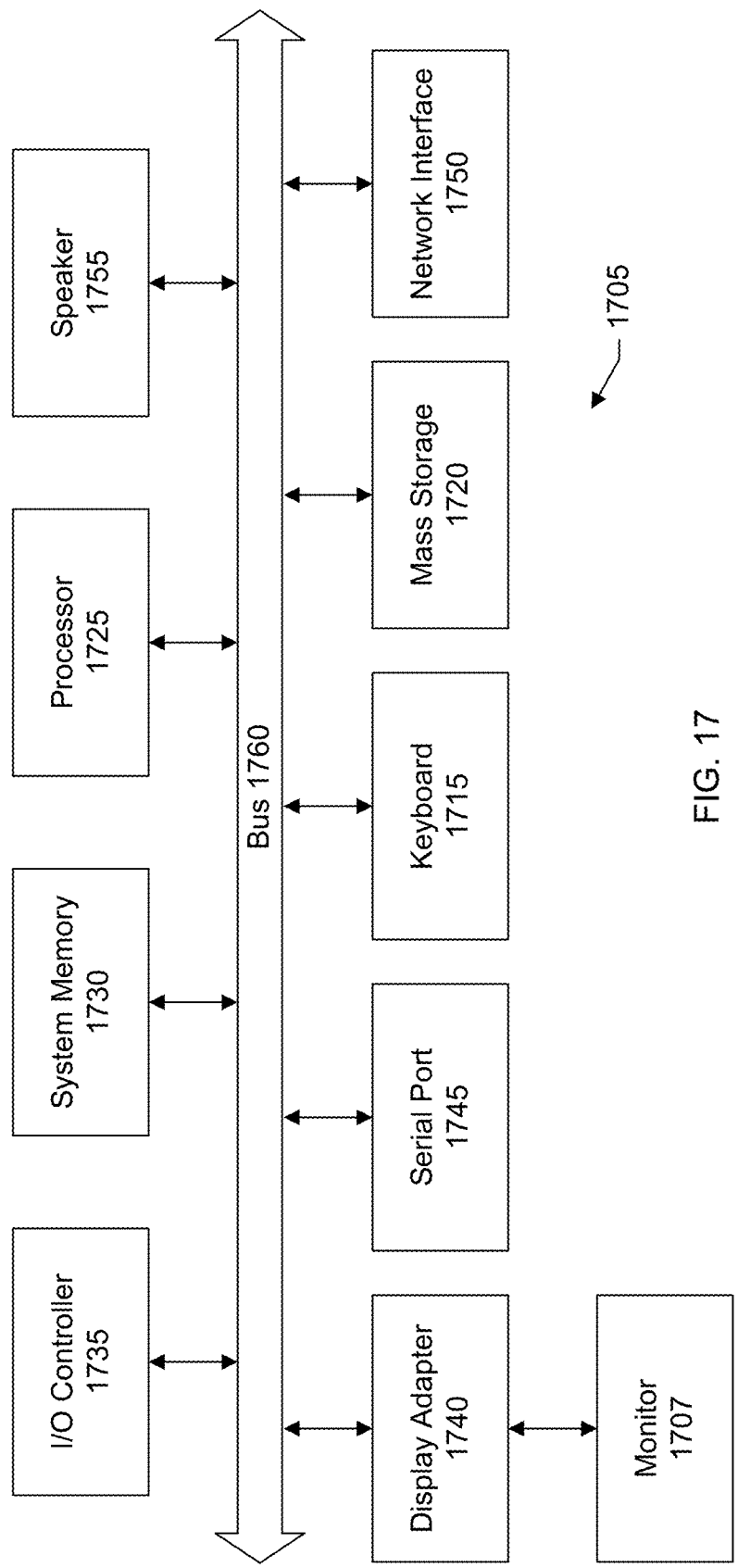
FIG. 17 shows a block diagram of a computer system suitable for use with the system, according to one or more embodiments.

FIG. 17 shows a system block diagram of a computer system 1705 used to execute the software of the present system described herein. The computer system includes a monitor 1707, keyboard 1715, and mass storage devices 1720. Computer system 1705 further includes subsystems such as central processor 1725, system memory 1730, input/output (I/O) controller 1735, display adapter 1740, serial or universal serial bus (USB) port 1745, network interface 1750, and speaker 1755. The system may also be used with computer systems with additional or fewer subsystems. For example, a computer system could include more than one processor 1725 (i.e., a multiprocessor system) or a system may include a cache memory.

Arrows such as 1760 represent the system bus architecture of computer system 1705. However, these arrows are illustrative of any interconnection scheme serving to link the subsystems. For example, speaker 1755 could be connected to the other subsystems through a port or have an internal direct connection to central processor 1725. The processor may include multiple processors or a multicore processor, which may permit parallel processing of information. Computer system 1705 shown in FIG. 17 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
    monitoring a plurality of resources in a deduplicated storage appliance to generate a consumption matrix indicating utilization of the resources;
    storing a first threshold map associated with a first subsystem, the first subsystem being responsible for a first operation involving one or more files managed by the deduplicated storage appliance, and the first threshold map specifying first thresholds for resources required by the first subsystem for the first operation and below which multi-streaming for the first operation is allowed;
    storing a second threshold map associated with a second subsystem, the second subsystem being responsible for a second operation involving the one or more files managed by the deduplicated storage appliance, and the second threshold map specifying second thresholds for the resources required by the second subsystem for the second operation and below which multi-streaming for the second operation is allowed,
    wherein the first thresholds for the resources specified in the first threshold map and required by the first subsystem for the first operation are different from the second thresholds for the same resources specified in the second threshold map and required by the second subsystem for the second operation;
    assessing whether one of the first or second operation should be handled by multi-streaming, the assessing comprising determining whether the resources required by a respective first or second subsystem for the one of the first or second operation are underutilized or overutilized based on the consumption matrix and a respective first or second threshold map corresponding to the respective first or second subsystem;
    when the resources required by the respective first or second subsystem for the one of the first or second operation are overutilized, not triggering multi-streaming; and
    when the resources required by the respective first or second subsystem for the one of the first or second operation are underutilized, triggering multi-streaming comprising:
        dividing the one or more files into a plurality of regions;
        enqueuing the regions onto a queue of the respective first or second subsystem; and
        instructing the respective first or second subsystem to initiate a plurality of threads to process the enqueued regions in parallel; and
    while the enqueued regions are being processed in parallel, periodically updating the consumption matrix and reassessing whether the one of the first or second operation should be handled by multi-streaming.

2. The method of claim 1 wherein the reassessing whether the one of the first or second operation should continue to be handled by multi-streaming comprises determining whether the resources required by the respective first or second subsystem for the one of the first or second operation are underutilized or overutilized based on the updated consumption matrix and the respective first or second threshold map, and the method further comprises:
    when the reassessment indicates that the resources are underutilized, increasing a number of regions into which the one or more files are divided to increase a number of plurality of threads initiated by the respective first or second subsystem for processing the enqueued regions in parallel.

3. The method of claim 1 wherein the reassessing whether the one of the first or second operation should continue to be handled by multi-streaming comprises determining whether the resources required by the respective first or second subsystem for the one of the first or second operation are underutilized or overutilized based on the updated consumption matrix and the respective first or second threshold map, and the method further comprises:
    when the reassessment indicates that the resources are overutilized, reducing utilization of the resources required by the respective first or second subsystem, the reducing comprising reducing a number of regions into which the one or more files are divided to decrease a number of the plurality of threads initiated by the respective first or second subsystem for processing the enqueued regions in parallel.

4. The method of claim 1 wherein the reassessing whether the one of the first or second operation should continue to be handled by multi-streaming comprises determining whether the resources required by the respective first or second subsystem for the one of the first or second operation are underutilized or overutilized based on the updated consumption matrix and the respective first or second threshold map, and the method further comprises:

when the reassessment indicates that the resources are overutilized, reducing utilization of the resources required by the respective first or second subsystem, the reducing comprising instructing the respective first or second subsystem to pause processing of any new regions enqueued onto the queue.

5. The method of claim 1 wherein the reassessing whether the one of the first or second operation should continue to be handled by multi-streaming comprises determining whether the resources required by the respective first or second subsystem for the one of the first or second operation are underutilized or overutilized based on the updated consumption matrix and the respective first or second threshold map, and the method further comprises:

when the reassessment indicates that the resources are overutilized, reducing utilization of the resources required by the respective first or second subsystem, the reducing comprising prioritizing selection of files from the one or more files having characteristics that require low utilization of the resources that are overutilized.

6. The method of claim 1 wherein a number of the plurality of regions into which the one or more files is divided is based on a degree of the underutilization.

7. The method of claim 1 wherein the first subsystem is a copy subsystem responsible for copying the one or more files from the deduplicated storage appliance to cloud storage, and wherein the second subsystem is a verification subsystem responsible for verifying that data of the one or more files have been properly copied to the cloud storage.

8. The method of claim 1 wherein the plurality of resources comprise network bandwidth and disk, the first subsystem is a copy subsystem responsible for copying the one or more files from the deduplicated storage appliance to cloud storage, the one or more files comprising files having high generation data and files having low generation data, and the method further comprises:

when usage of the network bandwidth is high, prioritizing the copying of the files having high generation data over the files having low generation data; and when usage of disk is high, prioritizing the copying of the files having low generation data over the files having high generation data.

9. A system comprising: a processor; and memory configured to store one or more sequences of instructions which, when executed by the processor, cause the processor to carry out the steps of:

monitoring a plurality of resources in a deduplicated storage appliance to generate a consumption matrix indicating utilization of the resources;

storing a first threshold map associated with a first subsystem, the first subsystem being responsible for a first operation involving one or more files managed by the deduplicated storage appliance, and the first threshold map specifying first thresholds for resources required by the first subsystem for the first operation and below which multi-streaming for the first operation is allowed;

storing a second threshold map associated with a second subsystem, the second subsystem being responsible for a second operation involving the one or more files managed by the deduplicated storage appliance, and the second threshold map specifying second thresholds for the resources required by the second subsystem for the second operation and below which multi-streaming for the second operation is allowed, wherein the first thresholds for the resources specified in the first threshold map and required by the first subsystem for the first operation are different from the second thresholds for the same resources specified in the second threshold map and required by the second subsystem for the second operation;

assessing whether one of the first or second operation should be handled by multi-streaming, the assessing comprising determining whether the resources required by a respective first or second subsystem for the one of the first or second operation are underutilized or overutilized based on the consumption matrix and a respective threshold map corresponding to the respective first or second subsystem;

when the resources required by the respective first or second subsystem for the one of the first or second operation are overutilized, not triggering multi-streaming; and when the resources required by the respective first or second subsystem for the one of the first or second operation are underutilized, triggering multi-streaming comprising:

dividing the one or more files into a plurality of regions;

enqueuing the regions onto a queue of the respective first or second subsystem; and instructing the respective first or second subsystem to initiate a plurality of threads to process the enqueued regions in parallel; and while the enqueued regions are being processed in parallel, periodically updating the consumption matrix and reassessing whether the one of the first or second operation should be handled by multi-streaming.

10. The system of claim 9 wherein the reassessing whether the one of the first or second operation should continue to be handled by multi-streaming comprises determining whether the resources required by the respective first or second subsystem for the one of the first or second operation are underutilized or overutilized based on the updated consumption matrix and the respective first or second threshold map, and the processor further carries out the steps of:

when the reassessment indicates that the resources are underutilized, increasing a number of regions into which the one or more files are divided to increase a number of plurality of threads initiated by the respective first or second subsystem for processing the enqueued regions in parallel.

11. The system of claim 9 wherein the reassessing whether the one of the first or second operation should continue to be handled by multi-streaming comprises determining whether the resources required by the respective first or second subsystem for the one of the first or second operation are underutilized or overutilized based on the updated consumption matrix and the respective first or second threshold map, and the processor further carries out the steps of:

when the reassessment indicates that the resources are overutilized, reducing utilization of the resources required by the respective first or second subsystem, the reducing comprising reducing a number of regions into which the one or more files are divided to decrease a number of the plurality of threads initiated by the respective first or second subsystem for processing the enqueued regions in parallel.

12. The system of claim 9 wherein the reassessing whether the one of the first or second operation should continue to be handled by multi-streaming comprises determining whether the resources required by the respective first or second subsystem for the operation are underutilized or overutilized based on the updated consumption matrix and the respective first or second threshold map, and the processor further carries out the steps of:
when the reassessment indicates that the resources are overutilized, reducing utilization of the resources required by the respective first or second subsystem, the reducing comprising instructing the respective first or second subsystem to pause processing of any new regions enqueued onto the queue.

13. The system of claim 9 wherein the reassessing whether the one of the first or second operation should continue to be handled by multi-streaming comprises determining whether the resources required by the respective first or second subsystem for the one of the first or second operation are underutilized or overutilized based on the updated consumption matrix and the respective first or second threshold map, and the processor further carries out the steps of:
when the reassessment indicates that the resources are overutilized, reducing utilization of the resources required by the respective first or second subsystem, the reducing comprising prioritizing selection of files from the one or more files having characteristics that require low utilization of the resources that are overutilized.

14. The system of claim 9 wherein a number of the plurality of regions into which the one or more files is divided is based on a degree of the underutilization.

15. A computer program product, comprising a non-transitory computer-readable medium having a computer-readable program code embodied therein, the computer-readable program code adapted to be executed by one or more processors to implement a method comprising:
monitoring a plurality of resources in a deduplicated storage appliance to generate a consumption matrix indicating utilization of the resources;
storing a first threshold map associated with a first subsystem, the first subsystem being responsible for a first operation involving one or more files managed by the deduplicated storage appliance, and the first threshold map specifying first thresholds for resources required by the first subsystem for the first operation and below which multi-streaming for the first operation is allowed;
storing a second threshold map associated with a second subsystem, the second subsystem being responsible for a second operation involving the one or more files managed by the deduplicated storage appliance, and the second threshold map specifying second thresholds for the resources required by the second subsystem for the second operation and below which multi-streaming for the second operation is allowed,
wherein the first thresholds for the resources specified in the first threshold map and required by the first subsystem for the first operation are different from the second thresholds for the same resources specified in the second threshold map and required by the second subsystem for the second operation;
assessing whether one of the first or second operation should be handled by multi-streaming, the assessing comprising determining whether the resources required by a respective first or second subsystem for the one of the first or second operation are underutilized or overutilized based on the consumption matrix and a respective first or second threshold map corresponding to the respective first or second subsystem;
when the resources required by the respective first or second subsystem for the one of the first or second operation are overutilized, not triggering multi-streaming; and
when the resources required by the respective first or second subsystem for the one of the first or second operation are underutilized, triggering multi-streaming comprising:
dividing the one or more files into a plurality of regions;
enqueuing the regions onto a queue of the respective first or second subsystem; and
instructing the respective first or second subsystem to initiate a plurality of threads to process the enqueued regions in parallel; and
while the enqueued regions are being processed in parallel, periodically updating the consumption matrix and reassessing whether the one of the first or second operation should be handled by multi-streaming.

16. The computer program product of claim 15 wherein the reassessing whether the one of the first or second operation should continue to be handled by multi-streaming comprises determining whether the resources required by the respective first or second subsystem for the operation are underutilized or overutilized based on the updated consumption matrix and the respective first or second threshold map, and the method further comprises:
when the reassessment indicates that the resources are underutilized, increasing a number of regions into which the one or more files are divided to increase a number of plurality of threads initiated by the respective first or second subsystem for processing the enqueued regions in parallel.

17. The computer program product of claim 15 wherein the reassessing whether the one of the first or second operation should continue to be handled by multi-streaming comprises determining whether the resources required by the respective first or second subsystem for the operation are underutilized or overutilized based on the updated consumption matrix and the respective first or second threshold map, and the method further comprises:
when the reassessment indicates that the resources are overutilized, reducing utilization of the resources required by the respective first or second subsystem, the reducing comprising reducing a number of regions into which the one or more files are divided to decrease a number of the plurality of threads initiated by the respective first or second subsystem for processing the enqueued regions in parallel.

18. The computer program product of claim 15 wherein the reassessing whether the one of the first or second operation should continue to be handled by multi-streaming comprises determining whether the resources required by the respective first or second subsystem for the operation are underutilized or overutilized based on the updated consumption matrix and the respective first or second threshold map, and the method further comprises:

when the reassessment indicates that the resources are overutilized, reducing utilization of the resources required by the respective first or second subsystem, the reducing comprising instructing the respective first or second subsystem to pause processing of any new regions enqueued onto the queue.

19. The computer program product of claim 15 wherein the reassessing whether the one of the first or second operation should continue to be handled by multi-streaming comprises determining whether the resources required by the respective first or second subsystem for the operation are underutilized or overutilized based on the updated consumption matrix and the respective first or second threshold map, and the method further comprises:

when the reassessment indicates that the resources are overutilized, reducing utilization of the resources required by the respective first or second subsystem, the reducing comprising prioritizing selection of files from the one or more files having characteristics that require low utilization of the resources that are overutilized.

20. The computer program product of claim 15 wherein a number of the plurality of regions into which the one or more files is divided is based on a degree of the underutilization.

* * * * *